United States Patent
Nakatani et al.

(10) Patent No.: US 7,468,403 B2
(45) Date of Patent: Dec. 23, 2008

(54) METHOD FOR PURIFICATION OF AQUEOUS FLUOROPOLYMER EMULSIONS, PURIFIED EMULSIONS, AND FLUORINE-CONTAINING FINISHED ARTICLES

(75) Inventors: Yasukazu Nakatani, Settsu (JP); Kenji Ichikawa, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/536,432

(22) PCT Filed: Oct. 6, 2003

(86) PCT No.: PCT/JP03/12752

§ 371 (c)(1),
(2), (4) Date: May 26, 2005

(87) PCT Pub. No.: WO2004/050719

PCT Pub. Date: Jun. 17, 2004

(65) Prior Publication Data

US 2006/0041051 A1     Feb. 23, 2006

(30) Foreign Application Priority Data

Nov. 29, 2002   (JP)  ............... 2002-348970

(51) Int. Cl.
*C08L 1/00*     (2006.01)
(52) U.S. Cl. .............. 523/310; 210/662; 524/544; 526/243; 554/191
(58) Field of Classification Search ......... 210/662; 524/544; 526/243; 554/191; 523/310
See application file for complete search history.

(56) References Cited

U.S. PATENT DOCUMENTS

| | | | |
|---|---|---|---|
| 2,559,752 A | | 7/1951 | Berry |
| 3,037,953 A | * | 6/1962 | Marks et al. ............. 524/546 |
| 3,301,807 A | * | 1/1967 | Hoashi ..................... 524/376 |
| 3,704,272 A | * | 11/1972 | Holmes .................... 524/376 |
| 4,369,266 A | | 1/1983 | Kuhls et al. |
| 5,039,598 A | * | 8/1991 | Abramsohn et al. ....... 430/347 |
| 6,706,193 B1 | * | 3/2004 | Burkard et al. ........... 210/662 |
| 6,720,437 B2 | * | 4/2004 | Jones et al. ............... 554/191 |
| 6,833,403 B1 | * | 12/2004 | Bladel et al. ............. 524/458 |

FOREIGN PATENT DOCUMENTS

| | | |
|---|---|---|
| EP | 1 283 225 A1 | 2/2003 |
| EP | 1 489 104 A1 | 12/2004 |
| EP | 1 661 922 A2 | 5/2006 |
| JP | 2-34971 | 8/1990 |
| JP | 2003/268034 * | 9/2003 |
| WO | WO-00/35971 * | 6/2000 |
| WO | WO 00/35971 A1 | 6/2000 |
| WO | WO 01/05710 A1 | 1/2001 |
| WO | WO 01/79332 A1 | 10/2001 |

* cited by examiner

*Primary Examiner*—Peter D. Mulcahy
*Assistant Examiner*—Henry Hu
(74) *Attorney, Agent, or Firm*—Sughrue Mion, PLLC

(57) ABSTRACT

The present invention provides a method of purifying an aqueous fluoropolymer emulsion by which fluorine-containing surfactants can be removed without lowering the dispersibility of the aqueous fluoropolymer dispersions.

The present invention provides a method of purifying an aqueous fluoropolymer emulsion comprising; purifying an aqueous fluoropolymer emulsion by a specific technique of concentration wherein the aqueous fluoropolymer emulsion comprises a fluoropolymer and a fluorine-containing surfactant, said specific technique of concentration comprises concentration by phase separation, electric concentration and/or ion exchange concentration, and said concentration by phase separation, electric concentration and/or ion exchange concentration is carried out for removing the fluorine-containing surfactant.

9 Claims, No Drawings

METHOD FOR PURIFICATION OF AQUEOUS FLUOROPOLYMER EMULSIONS, PURIFIED EMULSIONS, AND FLUORINE-CONTAINING FINISHED ARTICLES

TECHNICAL FIELD

The present invention relates to a method of purifying an aqueous fluoropolymer emulsion, a purified emulsion, and a fluorine-containing processed product.

BACKGROUND ART

Tetrafluoroethylene homopolymers, modified polytetrafluoroethylene and other fluoropolymers in the form of emulsions are used in various fields, such as in the field of coating compositions, utilizing those characteristics which the fluoropolymers have, such as nonstickiness, heat resistance, wear resistance, chemical resistance and low frictional characteristics.

Fluoropolymer emulsions can be obtained by subjecting at lease one fluoromonomer, such as tetrafluoroethylene [TFE], among others, to emulsion polymerization using a fluorine-containing surfactant comprising fluorine atoms as an emulsifier (cf. e.g. U.S. Pat. No. 2,559,752).

The aqueous fluoropolymer emulsions obtained by emulsion polymerization generally have a fluoropolymer concentration of about 15-35% by mass and, for industrial utilization thereof, the fluoropolymer emulsions are generally concentrated to a fluoropolymer concentration of about 40-75% by mass.

The aqueous fluoropolymer emulsions obtained by emulsion polymerization contain the fluorine-containing surfactant used as the emulsifier in carrying out the polymerization reaction. Fluorine-containing surfactants are generally expensive and, preferably, they should be removed.

Further, in cases where a fluoropolymer emulsion is used as a coating for instance, there arises the problem that some characteristics of the fluoropolymer are impaired when the amount of the fluorine-containing surfactant in the emulsion is large. Therefore, in recent years, it has been desired that the fluorine-containing surfactant be removed from the fluoropolymer emulsion. Thus, it is necessary to purify an aqueous fluoropolymer emulsion.

The aqueous fluoropolymer emulsion can be purified on the occasion of the concentration of the aqueous fluoropolymer emulsion. Known in the art as the method of concentrating aqueous fluoropolymer emulsions are concentration by membrane separation, electric concentration, concentration by evaporation, concentration by phase separation, and ion exchange concentration, among others. Among these concentration methods, concentration by evaporation and concentration by membrane separation are known to be capable of romoving fluorine-containing surfactants.

As for the concentration by evaporation, a method comprising concentrating aqueous fluoropolymer emulsions by evaporation under acidic conditions has been disclosed, and it is described that this method can remove the fluorine-containing surfactant (cf. e.g. WO 01/79332).

However, there is a problem that this method allows fluoropolymer particles to aggregate and precipitate and, as a result, the dispersion state of the fluoropolymer emulsion is damaged. Once the dispersion state has been damaged, it is generally difficult to restore the original dispersion state, so that it becomes impossible to obtain a purified emulsion.

As regards the concentration by membrane separation, it has been disclosed that the fluorine-containing surfactant in an aqueous fluoropolymer emulsion can be removed when a method of concentrating the aqueous fluoropolymer emulsion by membrane separation using a semipermeable ultrafiltration membrane is employed and pure water is added repeatedly after a certain extent of concentration (cf. e.g. Japanese Kokoku Publication H02-34971).

In this document, it is described that the content of the fluorine-containing surfactant can be reduced to about 0-0.1% by mass relative to the fluoropolymer. However, since the method of quantitating the fluorine-containing surfactant as described in this document is not very highly accurate, the fluorine-containing surfactant was not really removed to a satisfactory extent. Thus, the emulsion purified in the above manner has a problem, namely it cannot meet the recent demand for the removal of fluorine-containing surfactants.

In the case of concentration by membrane separation, for sufficiently removing the fluorine-containing surfactant, it is necessary to repeat the concentration step a number of times. Further, in the case of concentrating tetrafluoroethylene homopolymers, for instance, which are poor in mechanical stability, the tetrafluoroethylene homopolymers tend to form fibers on the semipermeable ultrafiltration membrane surface to block the membrane. Thus, a problem arises, namely the concentration efficiency decreases.

Concentration by phase separation is known to be a method capable of concentrating aqueous fluoropolymer emulsions while preventing the fluoropolymer from forming fibers without causing a decrease in dispersibility.

The concentration by phase separation generally comprises adding a nonionic surfactant to an aqueous fluoropolymer emulsion and heating the mixture to a temperature not lower than the cloud point of the nonionic surfactant to thereby cause separation into an aqueous phase and an oily phase (cf. e.g. U.S. Pat. No. 3,037,953). However, there is no description or suggestion about the removal of a fluorine-containing surfactant by concentration based on phase separation.

There is no description or suggestion about the removing a fluorine-containing surfactant by electric concentration and/or ion exchange concentration.

SUMMARY OF THE INVENTION

In view of the above-discussed state of the art, it is an object of the present invention to provide a method of purifying an aqueous fluoropolymer emulsion by which fluorine-containing surfactants can be removed without lowering the dispersibility of the aqueous fluoropolymer dispersions.

The present invention provides a method of purifying an aqueous fluoropolymer emulsion comprising; purifying the aqueous fluoropolymer emulsion by a specific technique of concentration, in which said aqueous fluoropolymer emulsion comprises a fluoropolymer and a fluorine-containing surfactant, said specific technique of concentration comprises concentration by phase separation, electric concentration and/or ion exchange concentration, and said concentration by phase separation, electric concentration and/or ion exchange concentration is carried out for removing the fluorine-containing surfactant.

The invention also provides a purified emulsion which is obtainable by the above-mentioned method of purifying an aqueous fluoropolymer emulsion.

The present invention is further directed to a fluorine-containing processed product which is obtainable by processing using the above-mentioned purified emulsion.

DETAILED DISCLOSURE OF THE INVENTION

In the following, the present invention is described in detail.

The method of purifying an aqueous fluoropolymer emulsion according to the present invention comprises purifying an aqueous fluoropolymer emulsion by a specific technique of concentration.

The aqueous fluoropolymer emulsion comprises a fluoropolymer and a fluorine-containing surfactant.

The term "aqueous fluoropolymer emulsion" as used herein refers to an emulsion obtained by emulsion polymerization for obtaining a fluoropolymer and not yet subjected to any aggregation or concentration treatment. The aqueous fluoropolymer emulsion is a dispersion of fluoropolymer particles obtained by emulsion polymerization in an aqueous medium under the action of the fluorine-containing surfactant. Thus, the aqueous fluoropolymer emulsion is a dispersion comprising the fluoropolymer particles as the dispersoid, the fluorine-containing surfactant as the dispersing agent, and the aqueous medium as the dispersion medium.

The aqueous medium is not particularly restricted but may be any water-containing one, for example a mixture of water and a water-soluble organic solvent, or water. From the good workability viewpoint, the medium is preferably free of any water-soluble organic solvent.

The fluoropolymer is not particularly restricted but may be any fluorine-containing one, for example the product of polymerization of a fluoromonomer. The "fluoromonomer" so referred to herein is an unsaturated compound having one or more fluorine atoms each bound to a carbon atom. The fluoromonomer is not particularly restricted but may be any polymerizable one, for example tetrafluoroethylene [TFE], chlorotrifluoroethylene [CTFE], trifluoroethylene, hexafluoropropylene [HFP], perfluoro(alkyl vinyl ether) [PAVE], or vinylidene fluoride [VdF]. The fluoropolymer may also be the product of polymerization of such a fluoromonomer as mentioned above and a fluorine-free vinyl monomer. The "fluorine-free vinyl monomer" so referred to herein is a monomer having a carbon-carbon double bond and having no fluorine atom. The fluorine-free vinyl monomer is not particularly restricted but includes, among others, ethylene and propylene. The fluoromonomer and fluorine-free vinyl monomer each may comprise one single species or two or more species.

The fluoropolymer is not particularly restricted but includes, among others, tetrafluoroethylene homopolymers [TFE homopolymers], modified polytetrafluoroethylene species [modified PTFEs], low-molecular-weight polytetrafluoroethylene, tetrafluoroethylene/perfluoro(alkyl vinyl ether) copolymers [PFAs], tetrafluoroethylene/hexafluoropropylene copolymers [FEPs], tetrafluoroethylene/perfluoro(alkyl vinyl ether)/hexafluoropropylene copolymers, ethylene/tetrafluoroethylene copolymers, tetrafluoroethylene/propylene copolymers, ethylene/hexafluoropropylene copolymers, tetrafluoroethylene/vinylidene fluoride copolymers, tetrafluoroethylene/vinylidene fluoride/chlorotrifluoroethylene copolymers, polychlorotrifluoroethylene, ethylene/chlorotrifluoroethylene copolymers, polyvinylidene fluoride [PVdF], vinylidene fluoride/hexafluoropropylene copolymers, tetrafluoroethylene/vinylidene fluoride/hexafluoropropylene copolymers [TFE/VdF/HFP copolymers], vinylidene fluoride/chlorotrifluoroethylene copolymers, fluoro(alkyl vinyl ether)/olefin copolymers, and ethylene/tetrafluoroethylene/hexafluoropropylene copolymers.

From the fluorine-containing removing efficiency viewpoint, the fluoropolymer preferably comprises a TFE homopolymer and/or a modified PTFE. The term "TFE homopolymer and/or modified PTFE" as used herein means a TFE homopolymer containing no modified PTFE, a modified PTFE containing no TFE homopolymer, or a mixture of both a TFE homopolymer and a modified PTFE.

The term "modified PTFE" as used herein means the product of copolymerization of TFE and a trace monomer other than TFE as used in such a slight amount that the product fluoropolymer will acquire no melt flow characteristics. The trace monomer is not particularly restricted but may be any one copolymerizable with TFE, for example HFP, CTFE, a PAVE, trifluoroethylene, or a perfluoroalkylethylene. The trace monomer may comprise one single species or two or more species. The content of the trace monomer in the modified PTFE is preferably 0.001 to 1% by mass based on the mass of the modified PTFE.

The method of emulsion polymerization for obtaining the above fluoropolymer is not particularly restricted but may be any of the methods known in the art provided that the method uses a fluorine-containing surfactant. As such a method known in the art, there may be mentioned, for example, the method comprising subjecting a fluoromonomer, if desired together with a fluorine-free vinyl monomer, to emulsion polymerization in an aqueous medium in the presence of a fluorine-containing surfactant, a polymerization stabilizer, a polymerization initiator and a chain transfer agent, among others.

The fluorine-containing surfactant is not particularly restricted but may be any fluorine atom-containing surfactant. Thus, it may be a nonionic surfactant, an anionic surfactant, a cationic surfactant or an amphoteric surfactant but preferably is an anionic surfactant in view of its being excellent in ability to disperse fluoropolymers. Preferred as the anionic surfactant are perfluorocarboxylic acid salts or ω-H type fluorocarboxylic acid salts in view of their being excellent in dispersive power. As the perfluorocarboxylic acid salts, there may be mentioned, for example, salts of perfluorocarboxylic acids containing 4-10 carbon atoms and, as the salts, there may be mentioned the ammonium salt, alkali metal salts and alkaline earth metal salts, among others. As the ω-H type fluorocarboxylic acid salts, there may be mentioned salts of ω-H type fluorocarboxylic acids represented by $H(CF_2CF_2)_n COOH$ (n representing an integer of not less than 1) and, for example, salts of ω-H type fluorocarboxylic acids of the above formula in which n is 3 or 4 can be used. As the ω-H type fluorocarboxylic acid salts, there may be mentioned, for example, the ammonium salt, alkali metal salts and alkaline earth metal salts. The fluorine-containing surfactant may comprise one single species or two or more species.

In the present specification, the above-mentioned fluorine-containing surfactant, which is used in emulsion polymerization, is to be conceptually distinguished from the nonionic surfactant to be used in the specific technique of concentration, which is to be mentioned later herein.

The polymerization stabilizer is not particularly restricted but may be any of those generally used in emulsion polymerization. For example, paraffin species may be mentioned.

The polymerization initiator is not particularly restricted but may be any of those generally used in emulsion polymerization. For example, ammonium persulfate and disuccinoyl peroxide may be mentioned.

The chain transfer agent is not particularly restricted but may be any of those generally used in emulsion polymerization. For examples, alcohols may be mentioned.

The polymerization conditions in the emulsion polymerization for obtained the above-mentioned fluoropolymer can be adequately selected according to the fluoropolymer to be produced.

The method of purifying an aqueous fluoropolymer emulsion according to the present invention aims at removing fluorine-containing surfactant and, in this respect, it is desirable that the charge amount of the fluorine-containing surfactant in the step of emulsion polymerization be small. As the method of reducing that charge amount, there may be mentioned the polymerization method comprising carrying out the polymerization at an increased polymerization pressure and the polymerization method giving a low yield of the fluoropolymer. As for the method of polymerization at an increased polymerization pressure, the method comprising carrying out the polymerization at 1.96 MPa or above, for instance, may be mentioned for the cases where the fluoropolymer is a TFE homopolymer and/or modified PTFE. The above-mentioned methods of reducing the charge amount in question all can maintain the stability of fluoropolymer particles in the aqueous fluoropolymer emulsion.

When the fluoropolymer is a TFE homopolymer and/or modified PTFE, for instance, and the above-mentioned emulsion polymerization is carried out, the aqueous fluoropolymer emulsion generally contains fluoropolymer particles with an average particle diameter of 100-500 nm.

The aqueous fluoropolymer emulsion generally contains 15-35% by mass of the fluoropolymer. Generally speaking, the aqueous fluoropolymer emulsion is preferably concentrated so that the fluoropolymer to be submitted to industrial use may have a fluoropolymer concentration of 40-75% by mass.

The method of purifying an aqueous fluoropolymer emulsion according to the present invention comprises purifying an aqueous fluoropolymer emulsion by a specific technique of concentration. The specific technique of concentration is a technique capable of attaining concentration as well as purification. The term "concentration" in the phrase "specific technique of concentration" as used herein means separating an aqueous fluoropolymer emulsion into two phases, namely a concentrated phase containing the fluoropolymer and an aqueous phase comprising water, a nonionic surfactant and a fluorine-containing surfactant. The "concentration" in the "specific technique of concentration" is preferably carried out to increase the fluoropolymer concentration to at least 1.1 times the concentration prior to concentration treatment. The emulsion obtained by concentrating the aqueous fluoropolymer emulsion mentioned above by the specific technique of concentration can have a fluoropolymer concentration of 40-75% by mass. The "emulsion obtained by concentrating an aqueous fluoropolymer emulsion by the specific technique of concentration" is herein sometimes referred to as "purified emulsion". The "purified emulsion" so referred to herein, which is an emulsion obtained by purifying an aqueous fluoropolymer emulsion by the method of purifying an aqueous fluoropolymer emulsion according to the present invention, is to be conceptually distinguished from the above-mentioned aqueous fluoropolymer emulsion.

Referring to the method of purifying an aqueous fluoropolymer emulsion according to the present invention, the specific technique of concentration comprises concentration by phase separation, electric concentration and/or ion exchange concentration. The "concentration by phase separation, electric concentration and/or ion exchange concentration" so referred to herein includes, within the meaning thereof, the concentration by phase separation so referred to herein, the electric concentration so referred to herein, the ion exchange concentration so referred to herein, a combination of the concentration by phase separation and the electric concentration, a combination of the concentration by phase separation and the ion exchange concentration, a combination of the electric concentration and the ion exchange concentration, and a combination of the concentration by phase separation, the electric concentration and the ion exchange concentration.

The concentration by phase separation, electric concentration and/or ion exchange concentration is carried out at least for removing the fluorine-containing surfactant and, as described hereinabove, for concentrating the aqueous fluoropolymer emulsion.

The fluorine-containing surfactant removed by the above-mentioned concentration by phase separation, electric concentration and/or ion exchange concentration can be recovered and reused.

In the method of purifying an aqueous fluoropolymer emulsion according to the present invention, the concentration by phase separation, electric concentration and/or ion exchange concentration is preferably carried out in the presence of at least 6,000 parts by mass of a nonionic surfactant per 100 parts by mass of the fluorine-containing surfactant.

The nonionic surfactant is the same as the nonionic surfactant to be mentioned later herein and preferably is a hydrocarbon-based surfactant, and polyoxyethylene tridecyl ether is preferred as the hydrocarbon-based surfactant.

A more preferred lower limit to the amount of the nonionic surfactant is 8,000 parts by mass, still more preferred lower limit is 10,000 parts by mass, and a preferred upper limit is 20,000 parts by mass and a more preferred upper limit is 17,000 parts by mass, per 100 parts by mass of the fluorine-containing surfactant. In cases where the fluoropolymer is a TFE homopolymer and/or modified PTFE, for instance, the treatment is preferably carried out in the presence of at least 8,000 parts by mass of a nonionic surfactant per 100 parts by mass of the fluorine-containing surfactant.

It is preferred that the concentration by phase separation, electric concentration and/or ion exchange concentration is carried out in the presence of the above-specified amount of a nonionic surfactant, since purified emulsions low in fluorine-containing surfactant content are obtained with ease.

The concentration by phase separation in the method of purifying an aqueous fluoropolymer emulsion according to the present invention has a separation/removal step comprising; heating an aqueous fluoropolymer emulsion in the presence of a specific amount of a nonionic surfactant, which is to be mentioned later herein, to cause separation into an aqueous phase and a concentrated phase and then recovering the concentrated phase by removing the aqueous phase. By mentioning herein that the concentration by phase separation is carried out once, it is meant that the above-mentioned separation/removal step is carried out once.

By saying "in the presence of a specific amount of a nonionic surfactant", it is meant that the "specific amount of a nonionic surfactant" may be present at any point of time at which the surfactant is at least in a position to manifest its effect (hereinafter sometimes referred to as "effect manifesting condition"). The term "effect manifesting condition" as used herein means a condition in which, owing to the presence of the above-mentioned "specific amount of a nonionic surfactant" in an aqueous fluoropolymer emulsion or in an aqueous fluoropolymer emulsion in a heated condition, the fluoropolymer particles in the aqueous fluoropolymer emulsion can be dispersed and the fluorine-containing surfactant in the aqueous fluoropolymer emulsion can be removed. The above-mentioned effect manifesting condition is generally a condition after the start of heating of the aqueous fluoropolymer emulsion and before completion of separation into an aqueous phase and a concentrated phase in the above-mentioned separation/removal step.

As described above, the specific amount of a nonionic surfactant is required to be present only at any arbitrary point of time at which the whole system is in the above-mentioned effect manifesting condition. Thus, while it is generally caused to be present in the aqueous fluoropolymer emulsion from the time before the above-mentioned start of heating, it is also possible to cause it to be absent before the start of heating but be present at any point of time after the start of heating when the system is in the above-mentioned effect manifesting condition.

The above-mentioned specific amount of a nonionic surfactant may be added either all at once or gradually. It is only required that the system be in the above-mentioned effect manifesting condition at the time point of arrival of the amount of the nonionic surfactant at the specific amount level.

The "specific amount" of a nonionic surfactant, so referred to herein, is an amount generally expressed in terms of parts by mass relative to the fluoropolymer or fluorine-containing surfactant and, for example, it is such an amount as 20-45 parts by mass per 100 parts by mass of the fluoropolymer in the case of carrying out the concentration by phase separation once for removing the fluorine-containing surfactant, as described later herein. While other numerical values than those given above will be given later herein for cases other than that mentioned above, such "specific amount" of a nonionic surfactant is, unless otherwise specified, the "specific amount" at which the system is at least in the above-defined effect manifesting condition at the time point of arrival of the existing amount at the "specific amount" level, as mentioned above.

The phrase "removing the aqueous phase" as used herein means that at least part of the aqueous phase is removed. From the fluorine-containing surfactant removing efficiency viewpoint, the "removing the aqueous phase" preferably comprises removing the whole amount of the aqueous phase. From the workability viewpoint, however, it may comprise removing 80% or more, preferably 90% or more, of the mass of the aqueous phase.

The nonionic surfactant generally has a cloud point. In the above separation/removal step, the temperature at which the above-mentioned heating is to be carried out may be a temperature at or above the cloud point of the nonionic surfactant employed and is generally 20-80° C.

The nonionic surfactant is not particularly restricted but preferably is a fluorine-free one in view of the object of the invention, although it may be a fluorine-containing one provided that even when it remains in the purified emulsion, the fluorine-containing processed product obtained using the purified emulsion can exhibit the characteristics, such as non-stickiness, heat resistance, wear resistance, chemical resistance and low friction characteristics, of the fluoropolymer. A hydrocarbon-based surfactant is preferred as the fluorine-free nonionic surfactant in view of its being excellent in dispersive power.

The hydrocarbon-based surfactant is not particularly restricted but may be any of the nonionic surfactants comprising a hydrocarbon group as a hydrophobic group, including, among others, polyoxyethylene alkyl ethers in which at least one of the ethylene oxide units may be substituted by a propylene oxide unit, for example polyoxyethylene lauryl ether, polyoxyethylene tridecyl ether, polyoxyethylene cetyl ether, polyoxyethylene stearyl ether, polyoxyethylene oleyl ether and polyoxyethylene higher alcohol ethers; polyoxyethylene alkylphenyl ethers which may have block units comprising ethylene oxide units and propylene oxide units, for example polyoxyethylene octylphenyl ether and polyoxyethylene nonylphenyl ether; oxyethylene/oxypropylene block copolymers; sorbitan fatty acid esters such as sorbitan laurate, sorbitan palmitate, sorbitan stearate and sorbitan oleate; monoglycerides of fatty acids such as stearic acid and oleic acid; polyethylene glycol fatty acid esters such as polyethylene glycol laurate, polyethylene glycol stearate and polyethylene glycol oleate; polyoxyethylenealkylamines such as polyoxyethylenelaurylamine and polyoxyethylenestearylamine; and derivatives of these. Such nonionic surfactants may be used singly or two or more of them may be used in combination.

In the method of purifying an aqueous fluoropolymer emulsion according to the present invention, when the concentration by phase separation is carried out once (one-time) for removing the fluorine-containing surfactant, the separation/removal step preferably comprises heating the emulsion in the presence of 20-45 parts by mass of a nonionic surfactant per 100 parts by mass of the fluoropolymer to thereby cause separation into an aqueous phase and a concentrated phase, followed by removing the aqueous phase to obtain the concentrated phase. At levels lower than 20 parts by mass, the fluorine-containing surfactant may not be removed to a satisfactory extent in certain instances and, at levels exceeding 45 parts by mass, it is difficult to attain an extra removing efficiency corresponding to the addition level even when the level of addition of the nonionic surfactant is further increased. From the fluorine-containing surfactant removing efficiency viewpoint, the lower limit to the level of addition of the nonionic surfactant is preferably 22 parts by mass, more preferably 24 parts by mass, still more preferably 25 parts by mass, per 100 parts by mass of the fluoropolymer. A preferred upper limit is 43 parts by mass, a more preferred upper limit is 40 parts by mass, and a still more preferred upper limit is 38 parts by mass.

In cases where the concentration by phase separation is carried out once and the fluoropolymer is a TFE homopolymer and/or modified PTFE, for instance, a preferred lower limit to the amount of the nonionic surfactant is 22 parts by mass, a more preferred lower limit is 24 parts by mass, a still more preferred lower limit is 25 parts by mass, and a preferred upper limit thereto is 43 parts by mass, a more preferred upper limit is 40 parts by mass and a still more preferred upper limit is 38 parts by mass, per 100 parts by mass of the fluoropolymer, in view of the fluorine-containing surfactant removing efficiency.

In cases where the concentration by phase separation is carried out once and the fluoropolymer is a PFA, for instance, a preferred lower limit to the amount of the nonionic surfactant is 25 parts by mass, a more preferred lower limit is 30 parts by mass, a still more preferred lower limit is 32 parts by mass, and a preferred upper limit thereto is 44 parts by mass, a more preferred upper limit is 43 parts by mass and a still more preferred upper limit is 42 parts by mass, per 100 parts by mass of the fluoropolymer, in view of the fluorine-containing surfactant removing efficiency.

In cases where the concentration by phase separation is carried out once and the fluoropolymer is a FEP, for instance, a preferred lower limit to the amount of the nonionic surfactant is 25 parts by mass, a more preferred lower limit is 30 parts by mass, a still more preferred lower limit is 32 parts by mass, and a preferred upper limit thereto is 44 parts by mass, a more preferred upper limit is 43 parts by mass and a still more preferred upper limit is 42 parts by mass, per 100 parts by mass of the fluoropolymer, in view of the fluorine-containing surfactant removing efficiency.

In cases where the concentration by phase separation is carried out once and the fluoropolymer is PVdF, for instance, a preferred lower limit to the amount of the nonionic surfactant is 30 parts by mass, a more preferred lower limit is 32 parts by mass, a still more preferred lower limit is 34 parts by mass, and a preferred upper limit thereto is 44 parts by mass, a more preferred upper limit is 43 parts by mass and a still more preferred upper limit is 42 parts by mass, per 100 parts by mass of the fluoropolymer, in view of the fluorine-containing surfactant removing efficiency.

In cases where the concentration by phase separation is carried out once and the fluoropolymer is a TFE/VdF/HFP copolymer, for instance, a preferred lower limit to the amount of the nonionic surfactant is 22 parts by mass, a more preferred lower limit is 24 parts by mass, a still more preferred lower limit is 25 parts by mass, and a preferred upper limit thereto is 44 parts by mass, a more preferred upper limit is 43 parts by mass and a still more preferred upper limit is 42 parts by mass, per 100 parts by mass of the fluoropolymer, in view of the fluorine-containing surfactant removing efficiency.

The concentration by phase separation may also be carried out in the presence of 500-20,000 parts by mass of a nonionic surfactant, per 100 parts by mass of the fluorine-containing surfactant in the aqueous fluoropolymer emulsion before the concentration by phase separation.

In accordance with the method of purifying an aqueous fluoropolymer emulsion according to the present invention, when the concentration by phase separation is carried out twice or more times for removing the fluorine-containing surfactant, it preferably has a separation/removal step comprising; heating the emulsion in the presence of 3-40 parts by mass of a nonionic surfactant per 100 parts by mass of the fluoropolymer to thereby cause separation into an aqueous phase and a concentrated phase, followed by removing the aqueous phase to obtain the concentrated phase.

In cases where the concentration by phase separation is carried out twice or more times, the first concentration by phase separation preferably has a separation/removal step comprising; heating the aqueous fluoropolymer emulsion in the presence of 3-40 parts by mass of a nonionic surfactant per 100 parts by mass of the fluoropolymer to cause separation into an aqueous phase and a concentrated phase, followed by removing the aqueous phase to obtain the concentrated phase, and the second and subsequent concentrations by phase separation each preferably has a water addition step, which is to be mentioned later herein, and the separation/removal step mentioned above.

In cases where the concentration by phase separation is carried out twice or more times, the nonionic surfactant is preferably present in an amount of 3-40 parts by mass per 100 parts by mass of the fluoropolymer in each separation/removal step. When the amount is less than 3 parts by mass, the concentration efficiency will go down and the purified emulsion obtained cannot be used for industrial use in some instances and, when it exceeds 40 parts by mass, any more extra removal efficiency corresponding to the increase in nonionic surfactant addition level will hardly be obtained. From the concentration efficiency and/or fluorine-containing surfactant removing efficiency viewpoint, a preferred lower limit to the amount of the nonionic surfactant is 10 parts by mass, a more preferred lower limit is 12 parts by mass, a still more preferred lower limit is 15 parts by mass, and a preferred upper limit thereto is 35 parts, a more preferred upper limit is 30 parts by mass and a still more preferred upper limit is 25 parts by mass, per 100 parts by mass of the fluoropolymer.

In cases where the concentration by separation is carried out twice or more times, the number of repetitions thereof is not particularly restricted provided that the number is 2 or more. The fluorine-containing surfactant can be removed to a satisfactory extent by repeating the concentration, for example, at least twice but at most 10 times. From the concentration efficiency viewpoint as well, it is sufficient to repeat the concentration by phase separation twice to 10 times.

In cases where the concentration by phase separation is carried out twice or more times, the separation/removal conditions, such as heating temperature and time, in the respective separation/removal steps may be the same or different.

In cases where the nonionic surfactant used has a molecular weight distribution and the concentration by phase separation is carried out twice or more times, those molecules having a molecular weight within a specific range among the molecules of the nonionic surfactant used may be selectively contained in the concentrated phase, whereby the concentration efficiency may go down. In cases the concentration efficiency has gone down, the concentration efficiency can be improved by modifying the separation/removal conditions.

In cases where it is carried out twice or more times, the concentration by phase separation in the N-th time run (N being an integer of not smaller than 2) preferably has, prior to the separation/removal step, a water addition step comprising; adding water to the concentrated phase obtained by the separation/removal step in the concentration by phase separation in the (N−1)th time run (N being the same as above defined) to thereby obtain a diluted emulsion. The addition of water in the concentration by phase separation in the N-th time run and the separation/removal step in the concentration by phase separation in the N-th time run (N being the same as above defined) are herein sometimes referred to as "N-th addition of water" and "N-th separation/removal step", respectively.

The "addition of water" so referred to herein comprises adding an aqueous medium mainly comprising water. The aqueous medium mainly comprising water may be water or a mixture of water and a water-soluble solvent, for instance. From the fluorine-containing surfactant removing efficiency viewpoint, pure water is preferred.

The phrase "prior to the separation/removal step" as used herein means that at least part of the amount, within a range to be mentioned later herein, of water is added prior to the separation/removal step. Thus, in the N-th addition of water, a part of the amount, within the later-mentioned range, of water may be added prior to the separation/removal step, followed by addition of the remaining portion with heating in the N-th separation/removal step, or the whole amount, within the later-mentioned range, of water to be added may be added prior to the N-th separation/removal step. From the fluorine-containing surfactant removing efficiency viewpoint, the N-th addition of water preferably comprises adding the whole amount, within the later-mentioned range, of water to be added prior to the N-th separation/removal step. The "amount of water to be added" so referred to herein is the mass of the aqueous medium mainly comprising water, which is to be added in the water addition step.

The addition of water in the concentration by phase separation in the N-th time run makes it easy for the diluted emulsion to separate into an aqueous phase and a concentrated phase, so that the fluoropolymer can be concentrated and the fluorine-containing surfactant can be removed from the concentrated phase into the aqueous phase.

As for the addition of water to be carried out prior to the N-th separation/removal step, water is preferably added in an amount such that the fluoropolymer in the diluted emulsion prior to the N-th separation/removal step amounts to at least 10% by mass relative to the mass of the diluted emulsion. It is preferred that water is added in an amount within the above range, since the working conditions, such as the level of addition of the nonionic surfactant, can be maintained constant or almost constant without causing any significant change in the fluoropolymer concentration in the diluted emulsion before the separation/removal step and therefore the procedure in the separation/removal step becomes simple and easy to perform. At levels lower than 10% by mass, the fluorine-containing surfactant can be removed but the nonionic surfactant can hardly form micelles, hence the concentration efficiency may deteriorate in certain instances. The concentration of the fluoropolymer in the above-mentioned diluted emulsion is preferably not higher than 40% by mass, for instance, in view of the fluorine-containing surfactant removing efficiency and the dispersibility of the diluted emulsion.

The addition of water to be carried out prior to the N-th separation/removal step preferably comprises adding water in an amount such that the fluoropolymer in the diluted emulsion prior to the N-th separation/removal step amounts to at least 10% by mass of the diluted emulsion and preferably comprises adding water in an amount substantially equal to the amount of the aqueous phase removed in the separation/removal step in the concentration by phase separation in the (N−1)th time run. The above-mentioned "amount of the aqueous phase" is the mass of the aqueous phase removed in the separation/removal step. The phrase "adding water in an amount substantially equal to the amount of the aqueous phase" used above means that the addition is carried out so that the mass of water added becomes substantially equal to the mass of the aqueous phase. The "amount substantially equal to . . ." may be an amount such that the concentration efficiency of the fluoropolymer in the separation/removal step becomes roughly equal in the concentration by phase separation in the N-th time run. Generally, it is an amount such that the difference between the mass of the aqueous phase removed and the mass of water added is within the range of the mass of the aqueous phase removed ±20%.

The diluted emulsion obtained in the water addition step in the concentration by phase separation in the N-th time run is one not yet subjected to the separation/removal step in the concentration by phase separation in the N-th time run, while the purified emulsion is one obtained by the separation/removal step and not yet subjected to the water addition step after that separation/removal step and, in this respect, the above-mentioned diluted emulsion is to be conceptually distinguished from the above-mentioned purified emulsion.

It is preferred that the addition of water as made prior to the N-th separation/removal step satisfied the conditions mentioned above, since the concentration of the fluoropolymer in the diluted emulsion in each separation/removal step can be made roughly constant and advantageous from the equipment viewpoint in each separation/removal step.

The nonionic surfactant is preferably present in an amount of 3-40 parts by mass per 100 parts by mass of the fluoropolymer at any time point at which the system is in the above-mentioned effect manifesting condition in the N-th concentration by phase separation. If the nonionic surfactant is present in an amount within the above-mentioned range at any time point at which the system is in the effect manifesting condition defined hereinabove, it is not necessary to add the surfactant each time but it is only necessary to supply the deficiency, if any, so that an amount within the range mentioned above may be present at any time point at which the system is in the effect manifesting condition. From the fluorine-containing surfactant removing efficiency viewpoint, however, the nonionic surfactant is preferably added in an amount substantially equal to the amount of the nonionic surfactant in the aqueous phase removed by the separation/removal step in the concentration by phase separation in the (N−1)th time run. The above-mentioned "amount of the nonionic surfactant in the aqueous phase removed in the separation/removal step" is the mass of the nonionic surfactant in the aqueous phase removed in the separation/removal step. The above-mentioned "amount substantially equal to . . ." may be an amount such that the fluoropolymer concentration efficiency is almost equal in the concentration by phase separation in the N-th time run and, generally, it is an amount such that the difference between the mass of nonionic surfactant in the aqueous phase removed and the mass of the nonionic surfactant added is within the range of the mass of the nonionic surfactant in the aqueous phase removed ±20%.

Owing to the presence of the above-mentioned amount of the nonionic surfactant in each concentration by phase separation, the dispersibility of the concentrated phase obtained by each concentration by phase separation can be maintained, and the concentration efficiency can be stabilized as a result of the amount of the nonionic surfactant per 100 parts by mass of the fluoropolymer being maintained constant.

The nonionic surfactants to be added in the respective concentrations by phase separation may be the same or different in kind.

In cases where the nonionic surfactant is present in the aqueous fluoropolymer emulsion, in an amount of 20-40 parts by mass per 100 parts of the fluoropolymer, at any time point at which the system is in the above-defined effect manifesting condition, the concentration by phase separation may be carried out either once or two or more times. By carrying out the concentration by phase separation once, however, it is possible to reduce the residual amount of the fluorine-containing surfactant to a level within the range to be mentioned later herein.

The method of removing the aqueous phase in carrying out the method of purifying an aqueous fluoropolymer emulsion is not particularly restricted but may be any of those methods known in the art.

The fluorine-containing surfactant contained in the aqueous phase removed is not particularly restricted but can be recovered from the aqueous phase by treatment using any of the known methods of recovering fluorine-containing surfactants, for example the method disclosed in Japanese Kokai Publication 2002-58966, and can be reused in emulsion polymerization for obtaining a fluoropolymer, for instance.

The concentration by phase separation in the method of purifying an aqueous fluoropolymer emulsion according to the present invention is to remove the fluorine-containing surfactant through addition of a nonionic surfactant. In the concentration by phase separation in the method of purifying an aqueous fluoropolymer emulsion according to the present invention, the same nonionic surfactant as the one used in ordinary concentration by phase separation can be used. This nonionic surfactant, which contains no fluorine atoms, is thought to be lower at least in the adsorbability on fluoropolymers as compared with the fluorine-containing surfactant mentioned above. On the other hand, the fluorine-containing surfactant to be removed, which has a hydrophobic group comprising of carbon atoms and fluorine atoms and thus has something common in chemical structure to fluoropolymers, is thought to be generally high in the adsorbability on the fluoropolymers. The method of purifying an aqueous fluoropolymer emulsion which comprises adding a nonionic surfactant lower in adsorbability on fluoropolymers and thus removing fluorine-containing surfactants high in adsorbability on fluoropolymers has not been conceived with ease in the art.

By causing an excess, relative to the fluorine-containing surfactant, of a nonionic surfactant to be present in accordance with the method of purifying an aqueous fluoropolymer emulsion according to the present invention, it is possible to substitute the fluorine-containing surfactant by the nonionic surfactant with ease and remove the fluorine-containing surfactant to a satisfactory extent by carrying out the concentration by phase separation only once. In cases where the concentration by phase separation is carried out twice or more times in accordance with the method of purifying an aqueous fluoropolymer emulsion according to the present invention, the total amount of the fluorine-containing surfactant distributed in the aqueous phase can be increased by repeating the above-mentioned addition of water even when the amount of the nonionic surfactant is small and, as a result, the fluorine-containing surfactant can be removed to a satisfactory extent. By repeating the above-mentioned addition of water, it becomes possible to remove not only the fluorine-containing surfactant but also the polymerization initiator and chain transfer agent, among others, used in emulsion polymerization and remaining unreacted, so that the fluorine-containing processed product, which is to be mentioned later herein, obtained by using the purified emulsion obtained can manifest the characteristics of the fluoropolymer, such as nonstickiness, heat resistance, wear resistance, chemical resistance and low friction characteristics, to a satisfactory extent.

While the specific technique of concentration in accordance with the method of purifying an aqueous fluoropolymer emulsion according to the present invention can reduce the residual amount of the fluorine-containing surfactant to a level within the range to be mentioned later herein even by concentration by phase separation, as described hereinabove, fluorine-containing surfactants can also be removed precisely when the specific technique of concentration comprises the above-mentioned concentration by phase separation as well as electric concentration and/or ion exchange concentration.

The phrase "concentration by phase separation as well as electric concentration and/or ion exchange concentration" as used herein means that the concentration by phase separation may be combined with electric concentration, or with ion exchange concentration, or with electric concentration and ion exchange concentration.

The electric concentration and ion exchange concentration each may be carried out before or after the above-mentioned concentration by phase separation or may be carried out while carrying out the above-mentioned concentration by phase separation. From the fluorine-containing surfactant removing efficiency viewpoint, however, each of them is preferably carried out after the concentration by phase separation.

The method of electric concentration is not particularly restricted but any of the methods known in the art, for example the method described in the specification of British Patent No. 642,025, can be employed. As a method of electric concentration known in the art, there may be mentioned, for example, the method comprising; adding a surfactant for electric concentration to an aqueous fluoropolymer emulsion and then concentrating the aqueous fluoropolymer emulsion by using a concentrator comprising a concentration vessel, an anode and a cathode disposed at both ends of the concentration vessel, and one or more diaphragms disposed in the concentration vessel and sending an electric current between the anode and cathode.

The surfactant for electric concentration is not particularly restricted but may be any of the surfactants to be generally used in electric concentration. Thus, generally, nonionic surfactants and anionic surfactants can be used. Preferred as the surfactant for electric concentration from the dispersive power viewpoint are nonionic surfactants, however. The nonionic surfactants are not particularly restricted but may be the same ones as the nonionic surfactants mentioned hereinabove referring to the concentration by phase separation, for instance. The nonionic surfactant to be used in electric concentration may be the same or different from the nonionic surfactant to be used in the above-mentioned concentration by phase separation and the nonionic surfactant to be used in ion exchange concentration, which is to be mentioned later herein, to be carried out if desired.

Generally, the surfactant for electric concentration may be added in an amount of 0.5-20 parts by mass per 100 parts by mass of the fluoropolymer.

The diaphragms mentioned above are not particularly restricted but may be any one to be generally used in electric concentration, and those having pores impermeable to fluoropolymers are preferred. As the diaphragms, there may be mentioned, for example, polytetrafluoroethylene-based membrane filters, cellulose-based membrane filters, and polycarbonate-based membrane filters.

When, in the electric concentration, the fluorine-containing surfactant is an anionic surfactant, the fluorine-containing surfactant can permeate through the diaphragm and migrate to the anode side, while the fluoropolymer cannot permeate through the diaphragm but sediments; thus, the aqueous fluoropolymer emulsion separates into a concentrated phase and an aqueous phase. In this way, the electric concentration can remove the fluorine-containing surfactant via the diaphragm and, further, when the aqueous phase is removed, the aqueous fluoropolymer can be concentrated.

The method of ion exchange concentration is not particularly restricted but any of the methods known in the art, for example the method described in Japanese Kokai Publication H08-20611, can be employed. As a hitherto-known method of ion exchange concentration, there may be mentioned, for example, the method comprising using an ion exchange concentrator comprising a concentration vessel and at least one ion exchange membrane disposed in the concentration vessel, adding the aqueous fluoropolymer emulsion supplemented with a surfactant for ion exchange concentration to a compartment, on one end, out of at least two compartments resulting from partitioning by the ion exchange membrane, adding an aqueous electrolyte solution to the compartment on the other end, and concentrating the aqueous fluoropolymer emulsion utilizing the electrolyte concentration difference arising via the ion exchange membrane.

The surfactant for ion exchange concentration is not particularly restricted but may be any of those surfactants generally used in ion exchange concentration. Generally, nonionic surfactants or anionic surfactants can be used. The surfactant for ion exchange concentration is preferably a nonionic surfactant from the dispersive power viewpoint. The nonionic surfactant is not particularly restricted but includes the same nonionic surfactants as mentioned hereinabove referring to the concentration by phase separation. The nonionic surfactant to be used in the ion exchange concentration, the nonionic surfactant to be used in the concentration by phase separation, and the nonionic surfactant to be optionally used in the electric concentration may be the same or different in kind.

Generally, the surfactant for ion exchange concentration may be added in an amount of 0.5-20 parts by mass per 100 parts by mass of the fluoropolymer.

The ion exchange membrane is not particularly restricted but may be any of those generally used in ion exchange concentration, including, for example, membranes made of a sulfonated polystyrene-divinylbenzene resin, phenolsulfonic acid resin, quaternary ammonium resin, or sulfo group- or carboxyl group- or like functional group-containing fluororesin.

The aqueous electrolyte solution is not particularly restricted but may be any of those generally used in ion exchange concentration. Thus, when the ion exchange membrane is a cation exchange membrane, an aqueous solution of an anionic electrolyte can be used and, when the ion exchange membrane is an anion exchange membrane, an aqueous solution of a cationic electrolyte can be used. As the anionic electrolyte, there may be mentioned, among others, such acidic compounds as sulfuric acid, nitric acid, hydrochloric acid, phosphoric acid, acetic acid and propionic acid, and salts of such acidic compounds. As the cationic electrolyte, there may be mentioned, for example, basic compounds and salts thereof, such as sodium sulfate, sodium hydroxide, potassium hydroxide, ammonium hydroxide and ammonium carbonate.

In cases where the fluorine-containing surfactant is an anionic surfactant in the ion exchange concentration and when, for example, an anion exchange membrane is used as the ion exchange membrane and an aqueous cationic electrolyte solution as the aqueous electrolyte solution, such use having no particular restrictive meaning, however, the fluorine-containing surfactant permeates through the ion exchange membrane and migrates to the electrolyte solution side. In this way, the ion exchange concentration can efficiently remove the fluorine-containing surfactant by means of the ion exchange membrane. The fluorine-containing surfactant, together with the water in the aqueous fluoropolymer emulsion, migrates to the aqueous electrolyte solution side and, thus, the ion exchange concentration can concentrate the aqueous fluoropolymer emulsion.

The specific technique of concentration in the method of purifying an aqueous fluoropolymer emulsion according to the present invention may be the above-mentioned electric concentration or ion exchange concentration. In cases where the specific technique of concentration is the above-mentioned electric concentration, the electric concentration is preferably carried out at least twice so that the fluorine-containing surfactant may be removed to a satisfactory extent. In cases where the specific technique of concentration is the above-mentioned ion exchange concentration, the ion exchange is preferably carried out at least twice so that the fluorine-containing surfactant may be removed to a satisfactory extent.

In cases where the electric concentration is carried out two or more times in carrying out the method of purifying an aqueous fluoropolymer emulsion according to the present invention, the electric concentration may generally be carried out each time while adding the 0.5-20 parts by mass, per 100 parts by mass of the fluoropolymer, of the surfactant for electric concentration. If the surfactant for electric concentration is present in an amount within the above range prior to each procedure for electric concentration, it is not necessary to add such surfactant each time; if there is a deficiency, it is only necessary to make up for the deficiency so that an amount within the above range may be present prior to performing each electric concentration procedure. The surfactants to be used in respective electric concentration procedures may be the same or different in kind.

In the electric concentration, water may be added prior to the electric concentration in the N-th time run (N being an integer of not smaller than 2). The addition of water is to add a medium mainly comprising water, as described hereinabove referring to the concentration by phase separation. The amount of water to be added is not particularly restricted but may roughly be such a mass as to enable the removal of the fluorine-containing surfactant. From the concentration efficiency viewpoint, however, the amount of water is preferably almost the same as the amount of the aqueous phase removed in the electric concentration in the (N−1)th time run. It is preferred that an amount within the above range is added, since it is possible to maintain the working conditions constant or almost constant without significantly varying the fluoropolymer concentration in the diluted emulsion prior to each separation/removal step; thus, the procedure for the separation/removal step is facilitated.

The electric concentration may be carried out either batchwise or continuously provided that it is carried out by adding the surfactant for electric concentration and water in respective amounts within the respective ranges mentioned above for removing the fluorine-containing surfactant to a satisfactory extent. When the electric concentration is carried out continuously, the process preferably comprises finally removing the aqueous phase.

In cases where the ion exchange concentration is carried out twice or more times in accordance with the method of purifying an aqueous fluoropolymer emulsion according to the present invention, each ion exchange concentration may generally be carried out following addition of 0.5-20 parts by mass, per 100 parts by mass of the fluoropolymer, of the surfactant for ion exchange concentration. If the surfactant for ion exchange concentration is present in an amount within the above range prior to each ion exchange concentration, it is not necessary to add such surfactant each time; if there is a deficiency, it is only necessary to make up for the deficiency so that an amount within the above range may be present prior to performing each ion exchange concentration. The surfactants to be used in each ion exchange concentration may be the same or different in kind.

In the ion exchange concentration, water may be added prior to the ion exchange concentration in the N-th time run (N being an integer of not smaller than 2). The addition of water is to add a medium mainly comprising water, as described hereinabove referring to the concentration by phase separation. The amount of water to be added is not particularly restricted but may roughly be such a mass as to enable the removal of the fluorine-containing surfactant. From the concentration efficiency viewpoint, however, the amount of water is preferably almost the same as the amount of the water removed in the ion exchange concentration in the (N−1)th time run. It is preferred that an amount within the above range is added, since it is possible to maintain the working conditions constant or almost constant without significantly varying the fluoropolymer concentration in the diluted emulsion prior to each separation/removal step; thus, the procedure for the separation/removal step is facilitated.

The ion exchange concentration may be carried out either batchwise or continuously provided that it is carried out by adding the surfactant for ion exchange concentration and water in respective amounts within the respective ranges mentioned above for removing the fluorine-containing surfactant to a satisfactory extent. When the ion exchange concentration is carried out continuously, the process preferably comprises finally removing the aqueous phase.

The purified emulsion obtained by purification using the method of purifying an aqueous fluoropolymer emulsion according to the present invention preferably does not contain the fluorine-containing surfactant. In cases where the fluoropolymer is a TFE homopolymer and/or modified PTFE, however, the purified emulsion may contain not more than 300 ppm of the fluorine-containing surfactant. If the fluorine-containing surfactant content is not higher than 300 ppm, the fluorine-containing processed product, which is to be mentioned later herein, obtained using the purified emulsion can satisfactorily manifest the characteristics of the fluoropolymer, such as nonstickiness, heat resistance, wear resistance, chemical resistance and low friction characteristics. When the fluoropolymer is a TFE homopolymer and/or modified PTFE, the above-mentioned method of purifying an aqueous fluoropolymer emulsion can reduce the residual amount of the fluorine-containing surfactant more preferably to 280 ppm or lower, still more preferably 250 ppm or lower.

The purified emulsion which contains the fluorine-containing surfactant at a level of 300 ppm or lower and in which the fluoropolymer is a TFE homopolymer and/or modified PTFE can be obtained with ease by carrying out the above-mentioned concentration by phase separation, electric concentration and/or ion exchange concentration in the presence of 6,000 parts by mass or more, preferably 8,000 parts by mass or more of a nonionic surfactant per 100 parts by mass of the fluorine-containing surfactant.

The fluorine-containing surfactant is preferably absent in the purified emulsion, as mentioned above. However, when the content thereof is not higher than 300 ppm, for example when that surfactant remains in an amount of 10 ppm or more, the fluorine-containing processed product to be mentioned later herein can still manifest the characteristic features intrinsic in the fluoropolymer so that no particular troubles will be caused at all.

The amounts of the fluorine-containing surfactant as given herein each is the value obtained by subjecting a sample solution and a standard reagent to $^{19}$F-NMR measurement and comparing the average values of the thus-obtained peak areas in the vicinity of −116 ppm to −117 ppm and the peak areas in the vicinity of −126 ppm. Generally, the sample solution is a mixed solution comprising the fluorine-containing surfactant and nonionic surfactant, and the aqueous solution of the fluorine-containing surfactant is used as the standard reagent. When the fluorine-containing surfactant in the sample solution is ammonium perfluorooctanoate, for instance, a 1,100 ppm aqueous solution of ammonium perfluorooctanoate is preferably used as the standard solution.

When the fluoropolymer is a PFA, for instance, the method of purifying an aqueous fluoropolymer emulsion according to the present invention can reduce the residual amount of the fluorine-containing surfactant in the purified emulsion to 1,800 ppm or below, preferably to 1,600 ppm or below, more preferably to 1,500 ppm or below.

When the fluoropolymer is an FEP, for instance, the method of purifying an aqueous fluoropolymer emulsion according to the present invention can reduce the residual amount of the fluorine-containing surfactant in the purified emulsion to 1,800 ppm or below, preferably to 1,700 ppm or below, more preferably to 1,600 ppm or below.

When the fluoropolymer is PVdF, for instance, the method of purifying an aqueous fluoropolymer emulsion according to the present invention can reduce the residual amount of the fluorine-containing surfactant in the purified emulsion to 800 ppm or below, preferably to 750 ppm or below, more preferably to 700 ppm or below.

When the fluoropolymer is PVdF, for instance, the method of purifying an aqueous fluoropolymer emulsion according to the present invention preferably comprises carrying out the concentration by phase separation twice or more times, since the extent of decrease in the residual amount of the fluorine-containing surfactant is great, although the method may comprise carrying out the concentration by phase separation only once.

When the fluoropolymer is a TFE/VdF/HFP copolymer, for instance, the method of purifying an aqueous fluoropolymer emulsion according to the present invention can reduce the residual amount of the fluorine-containing surfactant in the purified emulsion to 300 ppm or below, preferably to 280 ppm or below, more preferably to 250 ppm or below.

The method of purifying an aqueous fluoropolymer emulsion according to the present invention can reduce the residual amounts of the fluorine-containing surfactant in the purified emulsion to levels within the respective ranges mentioned above and preferably makes it possible for the characteristics intrinsic in the fluoropolymer to be manifested and, further, the fluorine-containing processed product to be mentioned later herein as obtained by using the above-mentioned purified emulsion can manifest the characteristics of the fluoropolymer to a satisfactory extent.

The purified emulsion obtained by the above-mentioned method of purifying an aqueous fluoropolymer emulsion also constitutes an aspect of the present invention. The above-mentioned purified emulsion, which has a fluorine-containing surfactant content reduced to a level within the range mentioned above, is preferred since the characteristics of the fluoropolymer can be manifested, and the fluorine-containing processed product to be mentioned later herein as obtained by using the above purified emulsion can fully manifest the characteristics intrinsic in the fluoropolymer. The above purified emulsion can be one concentrated to a content of the fluoropolymer of 40-75% by mass in the purified emulsion and can suitably be used for industrial purposes.

The above purified emulsion can be used either as such or after addition of one or more additives, as mentioned later herein, in coating by impregnation, coating by spraying and the like.

The purified emulsion can also be converted to a powder form by using any of the methods known in the art for obtaining powders from fluoropolymer emulsions.

By adding one or more additives to the above purified emulsion, it is possible to prepare a purified emulsion composition comprising the purified emulsion and the additives.

The additives are not particularly restricted but may be selected from among those to be generally added to emulsions, for example various surfactants, pure water, water-soluble solvents and other diluents for diluting the purified emulsion; leveling agents such as silicone-type surfactants, various water-soluble electrolyte salts, thickening agents, rheology modifiers and other compounds for adjusting the viscosity of the purified emulsion; colorants such as dyes and pigments; various fillers such as graphite; and preservatives. The above-mentioned various surfactants are not particularly restricted but those surfactants to be generally added to emulsions can be used; thus, they may be the same nonionic surfactants as used in the concentration by phase separation in carrying out the method of purifying an aqueous fluoropolymer emulsion according to the present invention.

As the above-mentioned purified emulsion composition, there may be mentioned, for example, a binder for cells and a coating composition.

Like the purified emulsion mentioned above, the purified emulsion composition can also be used, for example, in coating by impregnation and in coating by spraying.

In the case of nonaqueous electrolyte cells, for example lithium batteries, which comprise Li as a negative electrode active material, the binder for cells is used by adding them to a powder of a positive electrode active material such as carbon fluoride or manganese dioxide generally in an amount such that the fluoropolymer amounts to 1-20% by mass relative to the powder. The binder for cells can be added to the powder, and then rolled to give positive electrodes. When each positive electrode obtained is combined with a negative electrode such as a Li sheet, a cell can be obtained.

The coating composition may be one obtained by adding a pigment, a solvent, a coating additive and so forth to the above-mentioned purified emulsion. The coating composition can be used for coating metal-made cooking utensils, household electric appliances, machinery for industrial use, etc.

The above-mentioned pigment is preferably one having heat resistance and unsusceptible to deterioration even at temperatures not lower than the melting point of the fluoropolymer, and it may be an inorganic pigment or an organic pigment. The inorganic pigment includes, among others, composite oxide pigments comprising one or a combination of two or more of oxides of such metals as Cr, Ti, Co, Ni, Fe, Mn, Cu and Sb, cadmium pigments and other calcine-based calcined pigments, carbon black and ultramarine blue. The organic pigment includes, among others, phthalocyanine blue, phthalocyanine green, perylene pigments, and other ones having improved heat resistance. The level of addition of the pigment may be about 1-40% by mass relative to the fluoropolymer. Generally, the pigment is added preferably in a slurry form to the above-mentioned purified emulsion. The coating composition may also be one obtained by adding a commercial water-based coloring agent for fluororesins which contains about 1-50% by mass of such a pigment as mentioned above to the above purified emulsion.

The solvent is not particularly restricted but may be any of those generally added to coating compositions, including N,N-dimethylformamide, N,N-dimethylacetamide, N-methyl-2-pyrrolidone, dimethyl sulfoxide, methyl ethyl ketone, methyl glycol acetate, 2-nitropropane, ethylene glycol acetate and toluene, among others.

The coating additive is not particularly restricted but may be any of those generally added to coating compositions, including fillers such as glass, talc, mica, clay, silicon oxide, titanium oxide, alumina and ceramic compounds; thickening agents such as methylcellulose; and leveling agents, among others. The coating additive may be incorporated in the composition in an amount of 0.1-40 parts by mass per 100 parts by mass of the purified emulsion.

The fluorine-containing processed product is a product obtained by processing using the above-mentioned purified emulsion. The processing is not particularly restricted but may comprise, for example, applying the purified emulsion to a substrate and, after drying if desired, heating, or applying the purified emulsion to a substrate and, after drying if desired, heating, followed by peeling off to give a film, or molding a powder obtained by using the purified emulsion. The phrase "using the purified emulsion" used above means not only the use of the purified emulsion itself but also the use of purified emulsion composition mentioned above, since the purified emulsion composition comprises the purified emulsion, as described above.

The substrate is not particularly restricted but may be, for example, a fibrous substrate, a metal sheet, or a porous steel sheet. The fibrous substrate is not particularly restricted but includes, among others, glass fibers, ceramic fibers, metal fibers, silicon carbide fibers, and Kevlar (trademark).

The method of application is not particularly restricted but includes application by impregnation, and application by spraying, among others. When the substrate is a fibrous one, application by impregnation is preferred as the method of application, however.

The above-mentioned heating is preferably carried out at a temperature not lower than the melting point of the fluoropolymer.

The molding can be carried out using any of the conventional methods of molding fluoropolymer powders.

The fluorine-containing processed product of the invention is one obtained by using the above-mentioned purified emulsion low in residual fluorine-containing surfactant content and, therefore, can manifest the characteristics intrinsic in the fluoropolymer. It is not particularly restricted but includes, among others, roofing materials, transfer belts, packing materials and high-frequency printing substrates, all obtained by applying the purified emulsion to such fibrous substrates as mentioned above; cells obtained by using the above-mentioned binder for cells; metal-made cooking utensils, household electric appliances and industrial machinery obtained by using the above-mentioned coating composition; and various molded articles obtained by using the above-mentioned powder.

BEST MODES FOR CARRYING OUT THE INVENTION

The following examples illustrate the present invention in further detail. They are, however, by no means limitative of the scope of the invention.

PRODUCTION EXAMPLE 1

Preparation of an Aqueous Fluoropolymer Emulsion (TFE Homopolymer)

A 6-liter stainless steel autoclave was charged with 3 L of pure water, 96 g of high-grade paraffin as a polymerization stabilizer, and 3.0 g of ammonium perfluorooctanoate as an emulsifier. The system inside, after thorough nitrogen substitution, was evacuated. While the system inside temperature was maintained at 70° C., tetrafluoroethylene [TFE] was introduced under pressure with stirring until arrival of the inside pressure at 0.74 MPaG. Then, 20 mL of a 0.56 mg/mL aqueous solution of ammonium persulfate and 20 mL of a 13.5 ml/mL aqueous solution of disuccinoyl peroxide were introduced under pressure of TFE, and TFE was further introduced under pressure until arrival of the inside pressure at 0.83 MPaG, and the polymerization reaction was started.

At the time point at which the inside pressure lowered to 0.74 MPaG due to the progress of the reaction, TFE was introduced under pressure to restore the inside pressure to 0.83 MPaG. Thereafter, TFE was introduced under pressure with the progress of the reaction and, thus, the pressure was increased and allowed to lower repeatedly within the range of 0.74-0.83 MPaG.

At the time point of arrival of the total amount of TFE charged at 1,560 g, the stirring was discontinued, the autoclave was cooled, and the unreacted monomer was discharged to give an aqueous fluoropolymer emulsion with a tetrafluoroethylene homopolymer (hereinafter referred to also as "TFE homopolymer") concentration of about 30% by mass.

The particle diameter of the fluoropolymer particles as measured using a model CAPA-700 ultracentrifugation type automatic particle size analyzer (product of Horiba Ltd.) was 230 nm.

PRODUCTION EXAMPLE 2

Preparation of an Aqueous Fluoropolymer Emulsion (PFA)

A 6-liter stainless steel autoclave was charged with 3 L of pure water, 120 g of high-grade paraffin as a polymerization stabilizer, and 18 g of ammonium perfluorooctanoate as an emulsifier. The system inside, after thorough nitrogen substitution, was evacuated, and 36 g of perfluoro(propyl vinyl ether) was introduced under nitrogen gas pressure. Further, while the system inside temperature was maintained at 70° C., tetrafluoroethylene [TFE] was introduced under pressure with stirring until arrival of the inside pressure at 0.83 MPaG. Then, 10 mL of a 30 mg/mL aqueous solution of ammonium persulfate was introduced under nitrogen gas pressure, and the polymerization reaction was started.

At the time point at which the inside pressure lowered to 0.74 MPaG due to the progress of the reaction, TFE was introduced under pressure to restore the inside pressure to 0.83 MPaG. Thereafter, TFE was introduced under pressure with the progress of the reaction and, thus, the pressure was increased and allowed to lower repeatedly within the range of 0.74-0.83 MPaG.

At the time point of arrival of the total amount of TFE charged at 1,000 g, the stirring was discontinued, the autoclave was cooled, and the unreacted monomer was discharged to give an aqueous fluoropolymer emulsion with a tetrafluoroethylene/perfluoro(propyl vinyl ether) copolymer homopolymer (hereinafter referred to also as "PFA") concentration of about 25% by mass.

The particle diameter of the fluoropolymer particles as measured using a model CAPA-700 ultracentrifugation type automatic particle size analyzer (product of Horiba Ltd.) was 220 nm.

PRODUCTION EXAMPLE 3

Preparation of an Aqueous Fluoropolymer Emulsion (FEP)

A 4-liter stainless steel autoclave was charged with 2.5 L of pure water, 117 g of high-grade paraffin as a polymerization stabilizer, and 18 g of ammonium perfluorooctanoate as an emulsifier. The system inside, after thorough nitrogen substitution, was evacuated. While the system inside temperature was maintained at 80° C., a mixed gas A composed of tetrafluoroethylene [TFE] and hexafluoropropylene [HFP] in a mixing ratio of 30:70 (mole ratio) was introduced under pressure with stirring until arrival of the inside pressure at 0.76 MPaG. Then, 40 mL of a 30 mg/mL aqueous solution of ammonium persulfate was introduced under nitrogen gas pressure, and the polymerization reaction was started.

At the time point at which the inside pressure lowered to 0.71 MPaG due to the progress of the reaction, a mixed gas B composed of TFE and HFP in a mixing ratio of 92:8 (mole ratio) was introduced under pressure to restore the inside pressure to 0.76 MPaG. Thereafter, the mixed gas B was introduced under pressure with the progress of the reaction and, thus, the pressure was increased and allowed to lower repeatedly within the range of 0.71-0.76 MPaG. At the time point of arrival of the amount of the mixed gas B charged at 500 g, 50 mL of a 30 mg/mL aqueous solution of ammonium persulfate was introduced under nitrogen gas pressure, and the reaction was continued.

At the time point of arrival of the total amount of the mixed gas B charged at 1,100 g, the stirring was discontinued, the autoclave was cooled, and the unreacted monomers were discharged to give an aqueous fluoropolymer emulsion with a tetrafluoroethylene-hexafluoropropylene copolymer (hereinafter referred to also as "FEP") concentration of about 30% by mass.

The particle diameter of the fluoropolymer particles as measured using a model CAPA-700 ultracentrifugation type automatic particle size analyzer (product of Horiba, Ltd.) was 170 nm.

PRODUCTION EXAMPLE 4

Preparation of an Aqueous Fluoropolymer Emulsion (PVdF)

A 6-liter stainless steel autoclave was charged with 3 L of pure water, and 9.0 g of ammonium perfluorooctanoate as an emulsifier. The system inside, after thorough nitrogen substitution, was evacuated, and vinylidene fluoride [VdF] was introduced under pressure until arrival of the inside pressure at 0.21 MPaG. While maintaining the system inside temperature at 80° C., VdF was further introduced under pressure with stirring until arrival of the inside pressure at 1.47 MPaG. Then, 10 g of a 7.5% (by mass) aqueous solution of isopropyl alcohol was charged and, further, 20 mL of an 80 mg/mL aqueous solution of ammonium persulfate was introduced under nitrogen gas pressure, and the polymerization reaction was started.

During the polymerization reaction, VdF was continuously added for maintaining the inside pressure at 1.47 MPaG. At the time point of arrival of the additional amount of VdF at 360 g, 10 mL of an 80 mg/mL aqueous solution of ammonium persulfate was introduced under nitrogen gas pressure, and the reaction was continued.

At the time point of arrival of the additional amount of VdF at 630 g, the stirring was discontinued, the autoclave was cooled, and the unreacted monomer was discharged to give an aqueous fluoropolymer emulsion with a polyvinylidene fluoride (hereinafter referred to also as "PVdF") concentration of about 17% by mass.

The particle diameter of the fluoropolymer particles as measured using a model CAPA-700 ultracentrifugation type automatic particle size analyzer (product of Horiba, Ltd.) was 240 nm.

PRODUCTION EXAMPLE 5

Preparation of an Aqueous Fluoropolymer Emulsion (TFE/VdF/HFP Copolymer)

A 6-liter stainless steel autoclave was charged with 3 L of pure water and 3.0 g of ammonium perfluorooctanoate as an emulsifier. The system inside, after thorough nitrogen substitution, was evacuated. While the system inside temperature was maintained at 95° C., a mixed gas C composed of tetrafluoroethylene [TFE], vinylidene fluoride [VdF] and hexafluoropropylene [HFP] in a mixing ratio of 11:18:71 (mole ratio) was introduced under pressure with stirring until arrival of the inside pressure at 1.23 MPaG. Then, 20 mL of a 30 mg/mL aqueous solution of ammonium persulfate was introduced under nitrogen gas pressure, and the polymerization reaction was started.

At the time point at which the inside pressure lowered to 1.13 MPaG due to the progress of the reaction, a mixed gas D composed of TFE, VdF and HFP in a mixing ratio of 20:50:30 (mole ratio) was introduced under pressure to restore the inside pressure to 1.23 MPaG. Thereafter, the mixed gas D was introduced under pressure with the progress of the reaction and, thus, the pressure was increased and allowed to lower repeatedly within the range of 1.13-1.23 MPaG.

At the time point of arrival of the total amount of the mixed gas D charged at 1,000 g, the stirring was discontinued, the autoclave was cooled, and the unreacted monomers were discharged to give an aqueous fluoropolymer emulsion with a tetrafluoroethylene/vinylidene fluoride/hexafluoropropylene copolymer (hereinafter referred to also as "TFE/VdF/HFP copolymer") concentration of about 30% by mass.

The particle diameter of the fluoropolymer particles as measured using a model CAPA-700 ultracentrifugation type automatic particle size analyzer (product of Horiba, Ltd.) was 290 nm.

PRODUCTION EXAMPLE 6

Preparation of an Aqueous Fluoropolymer Emulsion
(TFE Homopolymer; High Pressure Polymerization)

A 3-liter stainless steel autoclave was charged with 1.8 L of pure water, 65 g of high-grade paraffin as a polymerization stabilizer, and 1.0 g of ammonium perfluorooctanoate as an emulsifier. The system inside, after thorough nitrogen substitution, was evacuated. While the system inside temperature was maintained at 85° C., tetrafluoroethylene [TFE] was introduced under pressure with stirring until arrival of the inside pressure at 2.55 MPaG. Then, 12 mL of a 0.56 mg/mL aqueous solution of ammonium persulfate and 12 mL of a 13.5 mg/mL aqueous solution of disuccinoyl peroxide were introduced under pressure of TFE, and TFE was further introduced under pressure until arrival of the inside pressure at 2.67 MPaG, and the polymerization reaction was started.

At the time point at which the inside pressure lowered to 2.55 MPaG due to the progress of the reaction, TFE was introduced under pressure to restore the inside pressure to 2.67 MPaG. Thereafter, TFE was introduced under pressure with the progress of the reaction and, thus, the pressure was increased and allowed to lower repeatedly within the range of 2.55-2.67 MPaG.

At the time point of arrival of the total amount of TFE charged at 800 g, the stirring was discontinued, the autoclave was cooled, and the unreacted monomer was discharged to give an aqueous fluoropolymer emulsion with a tetrafluoroethylene homopolymer (also referred to as "TFE homopolymer") concentration of about 30% by mass.

The particle diameter of the fluoropolymer particles as measured using a model CAPA-700 ultracentrifugation type automatic particle size analyzer (product of Horiba, Ltd.) was 240 nm.

EXPERIMENT EXAMPLE 1

Polyoxyethylene tridecyl ether (22 g; Leocol TD-90, product of Lion Corporation; hereinafter referred to as "nonionic surfactant"), a hydrocarbon-based surfactant used as a nonionic surfactant, was added to 600 g of the aqueous fluoropolymer emulsion obtained in Production Example 1. The mixture was further adjusted to pH 10-11 by addition of aqueous ammonia and then allowed to stand at 70° C. for concentration by phase separation to give a purified emulsion A with a fluoropolymer concentration of 70.1% by mass and a nonionic surfactant concentration of 2.1% by mass.

The mixed solution of fluorine-containing surfactant and nonionic surfactant was extracted from the purified emulsion A obtained. Separately, a 1,100 ppm aqueous solution of ammonium perfluorooctanoate was prepared and used as a standard reagent. The mixed solution and standard reagent were analyzed by $^{19}$F-NMR, and the fluorine-containing surfactant concentration in the mixed solution was determined by comparing the average value of the peak area at about –116 ppm to –117 ppm and the peak area at about –126 ppm therefor with that of the standard and, further, the fluorine-containing surfactant concentration in the purified emulsion A was calculated. The results are shown in Table 1.

EXPERIMENT EXAMPLE 2

The nonionic surfactant (22 g) was added to 600 g of the aqueous fluoropolymer emulsion obtained in Production Example 1, and the mixture was further adjusted to pH 10-11 by addition of aqueous ammonia and then allowed to stand at 70° C. This first concentration by phase separation gave a purified emulsion A with a fluoropolymer concentration of 70.1% by mass and a nonionic surfactant concentration of 2.1% by mass.

The nonionic surfactant and pure water were added to the above purified emulsion A to make the proportion of the nonionic surfactant to the fluoropolymer and the proportion of pure water to the fluoropolymer equal to those before the first concentration by phase separation. The resulting mixture was further adjusted to pH 10-11 by addition of aqueous ammonia and then allowed to stand at 70° C. This second concentration by phase separation gave a purified emulsion B with a fluoropolymer concentration of 66.1% by mass and a nonionic surfactant concentration of 1.9% by mass.

The mixed solution of fluorine-containing surfactant and nonionic surfactant was extracted from the purified emulsion B obtained. The mixed solution was analyzed by $^{19}$F-NMR in the same manner as in Experiment Example 1, and the fluorine-containing surfactant concentration in the mixed solution was determined and, further, the fluorine-containing surfactant concentration in the purified emulsion B was calculated. The results are shown in Table 1.

EXPERIMENT EXAMPLE 3

Using the purified emulsion B obtained in Experiment Example 2, a third concentration by phase separation was carried out following the same procedure as the second concentration by phase separation in Experiment Example 2 to give a purified emulsion C with a fluoropolymer concentration of 67.7% by mass and a nonionic surfactant concentration of 1.9% by mass.

The fluorine-containing surfactant concentration in the purified emulsion C was determined according to the same procedure as in Experiment Example 1. The results are shown in Table 1.

EXPERIMENT EXAMPLE 4

Using the purified emulsion C obtained in Experiment Example 3, a fourth concentration by phase separation was carried out following the same procedure as the second concentration by phase separation in Experiment Example 2 to give a purified emulsion with a fluoropolymer concentration of 70.0% by mass and a nonionic surfactant concentration of 2.2% by mass.

The fluorine-containing surfactant concentration in the purified emulsion obtained was determined according to the same procedure as in Experiment Example 1. The results are shown in Table 1.

EXPERIMENT EXAMPLE 5

The nonionic surfactant was added to the purified emulsion A obtained in Experiment Example 1 so that the nonionic surfactant might amount to 12.2 parts by mass per 100 parts by mass of the fluoropolymer. The mixture was further adjusted to pH 10-11 by addition of aqueous ammonia. Then, the mixture was subjected to electric concentration according to the method described in the specification of British Patent No. 642,025 to give a purified emulsion D with a fluoropolymer concentration of 68.7% by mass and a nonionic surfactant concentration of 2.3% by mass.

The fluorine-containing surfactant concentration in the purified emulsion D was determined according to the same procedure as in Experiment Example 1. The results are shown in Table 1.

EXPERIMENT EXAMPLE 6

The nonionic surfactant was added to the purified emulsion A obtained in Experiment Example 1 so that the nonionic surfactant might amount to 12.2 parts by mass per 100 parts by mass of the fluoropolymer. The mixture was further adjusted to pH 10-11 by addition of aqueous ammonia. Then, the mixture was subjected to ion exchange concentration according to the method described in Japanese Kokai Publication H08-20611 to give a purified emulsion with a fluoropolymer concentration of 68.4% by mass and a nonionic surfactant concentration of 1.7% by mass.

The fluorine-containing surfactant concentration in the purified emulsion obtained was determined according to the same procedure as in Experiment Example 1. The results are shown in Table 1.

EXPERIMENT EXAMPLE 7

The nonionic surfactant was added to the purified emulsion D obtained in Experiment Example 5 so that the nonionic surfactant might amount to 12.2 parts by mass per 100 parts by mass of the fluoropolymer. The mixture was further adjusted to pH 10-11 by addition of aqueous ammonia. Then, the mixture was subjected to ion exchange concentration to give a purified emulsion with a fluoropolymer concentration of 66.8% by mass and a nonionic surfactant concentration of 1.9% by mass.

The fluorine-containing surfactant concentration in the purified emulsion obtained was determined according to the same procedure as in Experiment Example 1. The results are shown in Table 1.

EXPERIMENT EXAMPLE 8

The nonionic surfactant (22 g) was added to 600 g of the aqueous fluoropolymer emulsion obtained in Production Example 1, and the mixture was further adjusted to pH 10-11 by addition of aqueous ammonia and then subjected to electric concentration once. The nonionic surfactant and pure water were added to the purified emulsion obtained by the above electric concentration to make the proportion of the nonionic surfactant to the fluoropolymer and the proportion of pure water to the fluoropolymer equal to those before the first electric concentration, and the resulting mixture was subjected to second electric concentration. The nonionic surfactant and pure water were added to the purified emulsion obtained by the second electric concentration to make the proportion of the nonionic surfactant to the fluoropolymer and the proportion of pure water to the fluoropolymer equal to those before the first electric concentration, and the resulting mixture was subjected to third electric concentration. The third electric concentration gave a purified emulsion with a fluoropolymer concentration of 64.3% by mass and a nonionic surfactant concentration of 2.1% by mass.

The fluorine-containing surfactant concentration in the purified emulsion was determined according to the same procedure as in Experiment Example 1. The results are shown in Table 1.

EXPERIMENT EXAMPLE 9

The nonionic surfactant (22 g) was added to 600 g of the aqueous fluoropolymer emulsion obtained in Production Example 1, and the mixture was further adjusted to pH 10-11 by addition of aqueous ammonia and then subjected to ion exchange concentration once. The nonionic surfactant and pure water were added to the purified emulsion obtained by the above concentration to make the proportion of the nonionic surfactant to the fluoropolymer and the proportion of pure water to the fluoropolymer equal to those before the first ion exchange concentration, and the resulting mixture was subjected to second ion exchange concentration. The nonionic surfactant and pure water were added to the purified emulsion obtained by the second ion exchange concentration to make the proportion of the nonionic surfactant to the fluoropolymer and the proportion of pure water to the fluoropolymer equal to those before the first ion exchange concentration, and the resulting mixture was subjected to third ion exchange concentration. The third ion exchange concentration gave a concentrated phase with a fluoropolymer concentration of 62.9% by mass and a nonionic surfactant concentration of 1.8% by mass.

The fluorine-containing surfactant concentration in the purified emulsion obtained was determined according to the same procedure as in Experiment Example 1. The results are shown in Table 1.

COMPARATIVE EXAMPLE 1

The nonionic surfactant (13 g) was added to 600 g of the aqueous fluoropolymer emulsion obtained in Production Example 1, and the mixture was further adjusted to pH 10-11 by addition of aqueous ammonia and then filtered through a ceramic-made precision filtration membrane with a pore size of 0.2 μm by causing the mixture to flow in parallel to the membrane face to give an emulsion E with a fluoropolymer concentration of 61.8% by mass and a nonionic surfactant concentration of 4.2% by mass. The precision filtration membrane was back washed with the permeated liquid using pressurized air for 0.5 second once per minute and, as a result, was never clogged up.

The fluorine-containing surfactant concentration in the emulsion E was determined according to the same procedure as in Experiment Example 1. The results are shown in Table 1.

COMPARATIVE EXAMPLE 2

The nonionic surfactant and pure water were added to the emulsion E obtained in Comparative Example 1 to make the proportion of the nonionic surfactant to the fluoropolymer and the proportion of pure water to the fluoropolymer equal to those before the concentration by membrane separation in Comparative Example 2 and the resulting mixture was filtered using the precision filtration membrane according to the same procedure as in Comparative Example 1 to give an emulsion F with a fluoropolymer concentration of 60.1% by mass and a nonionic surfactant concentration of 4.7% by mass. The precision filtration membrane was back washed with the permeated liquid using pressurized air for 0.5 second once per minute and, as a result, was never clogged up.

The fluorine-containing surfactant concentration in the emulsion F was determined according to the same procedure as in Experiment Example 1. The results are shown in Table 1.

COMPARATIVE EXAMPLE 3

The emulsion F obtained in Comparative Example 2 was filtered through the precision filtration membrane according to the same procedure as in Comparative Example 2 to give an emulsion G with a fluoropolymer concentration of 60.8% by mass and a nonionic surfactant concentration of 4.4% by mass. The precision filtration membrane was back washed with the permeated liquid using pressurized air for 0.5 second once per minute and, as a result, was never clogged up.

The fluorine-containing surfactant concentration in the emulsion G was determined according to the same procedure as in Experiment Example 1. The results are shown in Table 1.

COMPARATIVE EXAMPLE 4

The emulsion G obtained in Comparative Example 3 was filtered through the precision filtration membrane according to the same procedure as in Comparative Example 2 to give an emulsion with a fluoropolymer concentration of 61.2% by mass and a nonionic surfactant concentration of 4.3% by mass. The precision filtration membrane was back washed with the permeated liquid using pressurized air for 0.5 second once per minute and, as a result, was never clogged up.

The fluorine-containing surfactant concentration in the emulsion obtained was determined according to the same procedure as in Experiment Example 1. The results are shown in Table 1.

COMPARATIVE EXAMPLE 5

The nonionic surfactant (11 g) was added to 600 g of the aqueous fluoropolymer emulsion obtained in Production Example 1, and the mixture was allowed to stand at 70° C. and concentrated by evaporation to give a concentrate with a fluoropolymer concentration of 61.5% by mass and a nonionic surfactant concentration of 4.3% by mass. However, a large amount of TFE homopolymer aggregates were observed in the concentrate.

The fluorine-containing surfactant concentration in the concentrate after removal of the above-mentioned aggregates was determined according to the same procedure as in Experiment Example 1. The results are shown in Table 1.

COMPARATIVE EXAMPLE 6

The nonionic surfactant (11 g) was added to 600 g of the aqueous fluoropolymer emulsion obtained in Production Example 1, and the mixture was allowed to stand at 70° C. and concentrated by evaporation to give a concentrate with a fluoropolymer concentration of 48.2% by mass and a nonionic surfactant concentration of 3.1% by mass.

The fluorine-containing surfactant concentration in the concentrate obtained was determined according to the same procedure as in Experiment Example 1. The results are shown in Table 1.

EXPERIMENT EXAMPLE 10

The nonionic surfactant (22 g) was added to 600 g of the aqueous fluoropolymer emulsion obtained in Production Example 2, and the mixture was further adjusted to pH 10-11 by addition of aqueous ammonia and then allowed to stand at 70° C. and concentrated by phase separation to give a purified emulsion H with a fluoropolymer concentration of 53.8% by mass and a nonionic surfactant concentration of 2.7% by mass.

The fluorine-containing surfactant concentration in the purified emulsion H was determined according to the same procedure as in Experiment Example 1. The results are shown in Table 2.

EXPERIMENT EXAMPLE 11

The nonionic surfactant (22 g) was added to 600 g of the aqueous fluoropolymer emulsion obtained in Production Example 2, and the mixture was further adjusted to pH 10-11 by addition of aqueous ammonia and then allowed to stand at 70° C. This first concentration by phase separation gave a purified emulsion H with a fluoropolymer concentration of 53.8% by mass and a nonionic surfactant concentration of 2.7% by mass.

The nonionic surfactant and pure water were added to the purified emulsion H to make the proportion of the nonionic surfactant to the fluoropolymer and the proportion of pure water to the fluoropolymer equal to those before the first concentration by phase separation. The mixture was further adjusted to pH 10-11 by addition of aqueous ammonia and then allowed to stand at 70° C. This second concentration by phase separation gave a purified emulsion with a fluoropolymer concentration of 52.6% by mass and a nonionic surfactant concentration of 2.8% by mass.

The fluorine-containing surfactant concentration in the purified emulsion obtained was determined according to the same procedure as in Experiment Example 1. The results are shown in Table 2.

EXPERIMENT EXAMPLE 12

The nonionic surfactant was added to the purified emulsion H obtained in Experiment Example 11 so that the nonionic surfactant might amount to 14.7 parts by mass per 100 parts by mass of the fluoropolymer. The mixture was further adjusted to pH 10-11 by addition of aqueous ammonia. Then, the mixture was subjected to electric concentration to give a purified emulsion I with a fluoropolymer concentration of 50.4% by mass and a nonionic surfactant concentration of 2.9% by mass.

The fluorine-containing surfactant concentration in the purified emulsion I was determined according to the same procedure as in Experiment Example 1. The results are shown in Table 2.

EXPERIMENT EXAMPLE 13

The nonionic surfactant was added to the purified emulsion H obtained in Experiment Example 11 so that the nonionic surfactant might amount to 14.7 parts by mass per 100 parts by mass of the fluoropolymer. The mixture was further adjusted to pH 10-11 by addition of aqueous ammonia. Then, the mixture was subjected to ion exchange concentration to give a purified emulsion with a fluoropolymer concentration of 48.9% by mass and a nonionic surfactant concentration of 2.3% by mass.

The fluorine-containing surfactant concentration in the purified emulsion was determined according to the same procedure as in Experiment Example 1. The results are shown in Table 2.

EXPERIMENT EXAMPLE 14

The nonionic surfactant was added to the purified emulsion I obtained in Experiment Example 12 so that the nonionic surfactant might amount to 14.7 parts by mass per 100 parts by mass of the fluoropolymer. The mixture was further adjusted to pH 10-11 by addition of aqueous ammonia. Then, the mixture was subjected to ion exchange concentration to give a purified emulsion with a fluoropolymer concentration of 51.1% by mass and a nonionic surfactant concentration of 2.8% by mass.

The fluorine-containing surfactant concentration in the purified emulsion was determined according to the same procedure as in Experiment Example 1. The results are shown in Table 2.

COMPARATIVE EXAMPLE 7

The nonionic surfactant (13 g) was added to 600 g of the aqueous fluoropolymer emulsion obtained in Production Example 2, and the mixture was further adjusted to pH 10-11 by addition of aqueous ammonia and then filtered through a ceramic-made precision filtration membrane with a pore size of 0.2 μm by causing the mixture to flow in parallel to the membrane face to give an emulsion J with a fluoropolymer concentration of 48.4% by mass and a nonionic surfactant concentration of 6.5% by mass.

The fluorine-containing surfactant concentration in the emulsion J was determined according to the same procedure as in Experiment Example 1. The results are shown in Table 2.

COMPARATIVE EXAMPLE 8

The nonionic surfactant and pure water were added to the emulsion J obtained in Comparative Example 7 to make the proportion of the nonionic surfactant to the fluoropolymer and the proportion of pure water to the fluoropolymer equal to those before the concentration by membrane filtration in Comparative Example 7. The resulting mixture was filtered using the precision filtration membrane according to the same procedure as in Comparative Example 7 to give an emulsion with a fluoropolymer concentration of 49.0% by mass and a nonionic surfactant concentration of 5.1% by mass.

The fluorine-containing surfactant concentration in the emulsion obtained was determined according to the same procedure as in Experiment Example 1. The results are shown in Table 2.

EXPERIMENT EXAMPLE 15

The nonionic surfactant (22 g) was added to 600 g of the aqueous fluoropolymer emulsion obtained in Production Example 3, and the mixture was further adjusted to pH 10-11 by addition of aqueous ammonia and then allowed to stand at 70° C. and concentrated by phase separation to give a purified emulsion K with a fluoropolymer concentration of 65.2% by mass and a nonionic surfactant concentration of 2.5% by mass.

The fluorine-containing surfactant concentration in the purified emulsion K was determined according to the same procedure as in Experiment Example 1. The results are shown in Table 2.

EXPERIMENT EXAMPLE 16

The nonionic surfactant (22 g) was added to 600 g of the aqueous fluoropolymer emulsion obtained in Production Example 3, and the mixture was further adjusted to pH 10-11 by addition of aqueous ammonia and then allowed to stand at 70° C. This first concentration by phase separation gave a purified emulsion K with a fluoropolymer concentration of 65.2% by mass and a nonionic surfactant concentration of 2.5% by mass.

The nonionic surfactant and pure water were added to the above purified emulsion K to make the proportion of the nonionic surfactant to the fluoropolymer and the proportion of pure water to the fluoropolymer equal to those before the first concentration by phase separation. The resulting mixture was further adjusted to pH 10-11 by addition of aqueous ammonia and then allowed to stand at 70° C. This second concentration by phase separation gave a purified emulsion with a fluoropolymer concentration of 65.6% by mass and a nonionic surfactant concentration of 2.6% by mass.

The fluorine-containing surfactant concentration in the purified emulsion obtained was determined according to the same procedure as in Experiment Example 1. The results are shown in Table 2.

EXPERIMENT EXAMPLE 17

The nonionic surfactant was added to the purified emulsion K obtained in Experiment Example 16 so that the nonionic surfactant might amount to 12.2 parts by mass per 100 parts by mass of the fluoropolymer. The mixture was further adjusted to pH 10-11 by addition of aqueous ammonia. Then, the mixture was subjected to electric concentration to give a purified emulsion L with a fluoropolymer concentration of 61.4% by mass and a nonionic surfactant concentration of 2.8% by mass.

The fluorine-containing surfactant concentration in the purified emulsion L was determined according to the same procedure as in Experiment Example 1. The results are shown in Table 2.

EXPERIMENT EXAMPLE 18

The nonionic surfactant was added to the purified emulsion K obtained in Experiment Example 16 so that the nonionic surfactant might amount to 12.2 parts by mass per 100 parts by mass of the fluoropolymer. The mixture was further adjusted to pH 10-11 by addition of aqueous ammonia. Then, the mixture was subjected to ion exchange concentration to give a purified emulsion with a fluoropolymer concentration of 60.3% by mass and a nonionic surfactant concentration of 2.1% by mass.

The fluorine-containing surfactant concentration in the purified emulsion obtained was determined according to the same procedure as in Experiment Example 1. The results are shown in Table 2.

EXPERIMENT EXAMPLE 19

The nonionic surfactant was added to the purified emulsion L obtained in Experiment Example 17 so that the nonionic surfactant might amount to 12.2 parts by mass per 100 parts by mass of the fluoropolymer. The mixture was further adjusted to pH 10-11 by addition of aqueous ammonia. Then, the mixture was subjected to ion exchange concentration to give a purified emulsion with a fluoropolymer concentration of 61.5% by mass and a nonionic surfactant concentration of 3.0% by mass.

The fluorine-containing surfactant concentration in the purified emulsion obtained was determined according to the same procedure as in Experiment Example 1. The results are shown in Table 2.

COMPARATIVE EXAMPLE 9

The nonionic surfactant (13 g) was added to 600 g of the aqueous fluoropolymer emulsion obtained in Production Example 3, and the mixture was further adjusted to pH 10-11 by addition of aqueous ammonia and then filtered through a ceramic-made precision filtration membrane with a pore size of 0.2 μm by causing the mixture to flow in parallel to the membrane face to give an emulsion M with a fluoropolymer concentration of 61.2% by mass and a nonionic surfactant concentration of 4.0% by mass.

The fluorine-containing surfactant concentration in the emulsion M was determined according to the same procedure as in Experiment Example 1. The results are shown in Table 2.

COMPARATIVE EXAMPLE 10

The nonionic surfactant and pure water were added to the emulsion M obtained in Comparative Example 9 to make the proportion of the nonionic surfactant to the fluoropolymer and the proportion of pure water to the fluoropolymer equal to those before the concentration by membrane filtration in Comparative Example 9. The resulting mixture was filtered using the precision filtration membrane according to the same procedure as in Comparative Example 9 to give an emulsion with a fluoropolymer concentration of 60.3% by mass and a nonionic surfactant concentration of 4.3% by mass.

The fluorine-containing surfactant concentration in the emulsion obtained was determined according to the same procedure as in Experiment Example 1. The results are shown in Table 2.

EXPERIMENT EXAMPLE 20

The nonionic surfactant (12 g) was added to 600 g of the aqueous fluoropolymer emulsion obtained in Production Example 4, and the mixture was further adjusted to pH 10-11 by addition of aqueous ammonia and then allowed to stand at 70° C. and concentrated by phase separation to give a purified emulsion N with a fluoropolymer concentration of 59.0% by mass and a nonionic surfactant concentration of 5.0% by mass.

The fluorine-containing surfactant concentration in the purified emulsion N was determined according to the same procedure as in Experiment Example 1. The results are shown in Table 3.

EXPERIMENT EXAMPLE 21

The nonionic surfactant (12 g) was added to 600 g of the aqueous fluoropolymer emulsion obtained in Production Example 4, and the mixture was further adjusted to pH 10-11 by addition of aqueous ammonia and then allowed to stand at 70° C. This first concentration by phase separation gave a purified emulsion N with a fluoropolymer concentration of 59.0% by mass and a nonionic surfactant concentration of 5.0% by mass.

The nonionic surfactant and pure water were added to the above purified emulsion N to make the proportion of the nonionic surfactant to the fluoropolymer and the proportion of pure water to the fluoropolymer equal to those before the first concentration by phase separation. The resulting mixture was further adjusted to pH 10-11 by addition of aqueous ammonia and then allowed to stand at 70° C. This second concentration by phase separation gave a purified emulsion with a fluoropolymer concentration of 59.1% by mass and a nonionic surfactant concentration of 5.1% by mass.

The fluorine-containing surfactant concentration in the purified emulsion obtained was determined according to the same procedure as in Experiment Example 1. The results are shown in Table 3.

EXPERIMENT EXAMPLE 22

The nonionic surfactant was added to the purified emulsion N obtained in Experiment Example 21 so that the nonionic surfactant might amount to 11.8 parts by mass per 100 parts by mass of the fluoropolymer. The mixture was further adjusted to pH 10-11 by addition of aqueous ammonia. Then, the mixture was subjected to electric concentration to give a purified emulsion 0 with a fluoropolymer concentration of 55.1% by mass and a nonionic surfactant concentration of 5.0% by mass.

The fluorine-containing surfactant concentration in the purified emulsion 0 was determined according to the same procedure as in Experiment Example 1. The results are shown in Table 3.

EXPERIMENT EXAMPLE 23

The nonionic surfactant was added to the purified emulsion N obtained in Experiment Example 21 so that the nonionic surfactant might amount to 11.8 parts by mass per 100 parts by mass of the fluoropolymer. The mixture was further adjusted to pH 10-11 by addition of aqueous ammonia. Then, the mixture was subjected to ion exchange concentration to give a purified emulsion with a fluoropolymer concentration of 55.0% by mass and a nonionic surfactant concentration of 4.9% by mass.

The fluorine-containing surfactant concentration in the purified emulsion obtained was determined according to the same procedure as in Experiment Example 1. The results are shown in Table 3.

EXPERIMENT EXAMPLE 24

The nonionic surfactant was added to the purified emulsion 0 obtained in Experiment Example 22 so that the nonionic surfactant might amount to 11.8 parts by mass per 100 parts by mass of the fluoropolymer. The mixture was further adjusted to pH 10-11 by addition of aqueous ammonia. Then, the mixture was subjected to ion exchange concentration to give a purified emulsion with a fluoropolymer concentration of 56.1% by mass and a nonionic surfactant concentration of 4.9% by mass.

The fluorine-containing surfactant concentration in the purified emulsion obtained was determined according to the same procedure as in Experiment Example 1. The results are shown in Table 3.

COMPARATIVE EXAMPLE 11

The nonionic surfactant (7 g) was added to 600 g of the aqueous fluoropolymer emulsion obtained in Production Example 4, and the mixture was further adjusted to pH 10-11 by addition of aqueous ammonia and then filtered through a ceramic-made precision filtration membrane with a pore size of 0.2 µm by causing the mixture to flow in parallel to the membrane face to give an emulsion P with a fluoropolymer concentration of 51.0% by mass and a nonionic surfactant concentration of 5.2% by mass.

The fluorine-containing surfactant concentration in the emulsion P was determined according to the same procedure as in Experiment Example 1. The results are shown in Table 3.

COMPARATIVE EXAMPLE 12

The nonionic surfactant and pure water were added to the emulsion P obtained in Comparative Example 11 to make the proportion of the nonionic surfactant to the fluoropolymer and the proportion of pure water to the fluoropolymer equal to those before the concentration by membrane filtration in Comparative Example 11. The resulting mixture further adjusted to pH 10-11 by addition of aqueous ammonia and then filtered through a ceramic-made precision filtration membrane with a pore size of 0.2 µm by causing the mixture to flow in parallel to the membrane face to give an emulsion with a fluoropolymer concentration of 51.1% by mass and a nonionic surfactant concentration of 5.1% by mass.

The fluorine-containing surfactant concentration in the emulsion obtained was determined according to the same procedure as in Experiment Example 1. The results are shown in Table 3.

EXPERIMENT EXAMPLE 25

The nonionic surfactant (22 g) was added to 600 g of the aqueous fluoropolymer emulsion obtained in Production Example 5, and the mixture was further adjusted to pH 10-11 by addition of aqueous ammonia and then allowed to stand at 70° C. and concentrated by phase separation to give a purified emulsion Q with a fluoropolymer concentration of 66.6% by mass and a nonionic surfactant concentration of 2.2% by mass.

The fluorine-containing surfactant concentration in the purified emulsion Q was determined according to the same procedure as in Experiment Example 1. The results are shown in Table 3.

EXPERIMENT EXAMPLE 26

The nonionic surfactant (22 g) was added to 600 g of the aqueous fluoropolymer emulsion obtained in Production Example 5, and the mixture was further adjusted to pH 10-11 by addition of aqueous ammonia and then allowed to stand at 70° C. This first concentration by phase separation gave a purified emulsion Q with a fluoropolymer concentration of 66.6% by mass and a nonionic surfactant concentration of 2.2% by mass.

The nonionic surfactant and pure water were added to the above purified emulsion Q to make the proportion of the nonionic surfactant to the fluoropolymer and the proportion of pure water to the fluoropolymer equal to those before the first concentration by phase separation. The resulting mixture was further adjusted to pH 10-11 by addition of aqueous ammonia and then allowed to stand at 70° C. This second concentration by phase separation gave a purified emulsion with a fluoropolymer concentration of 65.9% by mass and a nonionic surfactant concentration of 2.2% by mass.

The fluorine-containing surfactant concentration in the purified emulsion obtained was determined according to the same procedure as in Experiment Example 1. The results are shown in Table 3.

EXPERIMENT EXAMPLE 27

The nonionic surfactant was added to the purified emulsion Q obtained in Experiment Example 26 so that the nonionic surfactant might amount to 12.2 parts by mass per 100 parts by mass of the fluoropolymer. The mixture was further adjusted to pH 10-11 by addition of aqueous ammonia. Then, the mixture was subjected to electric concentration to give a purified emulsion R with a fluoropolymer concentration of 63.4% by mass and a nonionic surfactant concentration of 2.6% by mass.

The fluorine-containing surfactant concentration in the purified emulsion R was determined according to the same procedure as in Experiment Example 1. The results are shown in Table 3.

EXPERIMENT EXAMPLE 28

The nonionic surfactant was added to the purified emulsion Q obtained in Experiment Example 26 so that the nonionic surfactant might amount to 12.2 parts by mass per 100 parts by mass of the fluoropolymer. The mixture was further adjusted to pH 10-11 by addition of aqueous ammonia. Then, the mixture was subjected to ion exchange concentration to give a purified emulsion with a fluoropolymer concentration of 63.2% by mass and a nonionic surfactant concentration of 2.9% by mass.

The fluorine-containing surfactant concentration in the purified emulsion obtained was determined according to the same procedure as in Experiment Example 1. The results are shown in Table 3.

EXPERIMENT EXAMPLE 29

The nonionic surfactant was added to the purified emulsion R obtained in Experiment Example 27 so that the nonionic surfactant might amount to 12.2 parts by mass per 100 parts by mass of the fluoropolymer. The mixture was further adjusted to pH 10-11 by addition of aqueous ammonia. Then, the mixture was subjected to ion exchange concentration to give a purified emulsion with a fluoropolymer concentration of 61.9% by mass and a nonionic surfactant concentration of 2.3% by mass.

The fluorine-containing surfactant concentration in the purified emulsion obtained was determined according to the same procedure as in Experiment Example 1. The results are shown in Table 3.

COMPARATIVE EXAMPLE 13

The nonionic surfactant (13 g) was added to 600 g of the aqueous fluoropolymer emulsion obtained in Production Example 5, and the mixture was further adjusted to pH 10-11 by addition of aqueous ammonia and then filtered through a ceramic-made precision filtration membrane with a pore size of 0.2 µm by causing the mixture to flow in parallel to the membrane face to give an emulsion S with a fluoropolymer concentration of 62.8% by mass and a nonionic surfactant concentration of 4.7% by mass.

The fluorine-containing surfactant concentration in the emulsion S was determined according to the same procedure as in Experiment Example 1. The results are shown in Table 3.

COMPARATIVE EXAMPLE 14

The nonionic surfactant and pure water were added to the emulsion S obtained in Comparative Example 13 to make the proportion of the nonionic surfactant to the fluoropolymer and the proportion of pure water to the fluoropolymer equal to those before the concentration by membrane filtration in Comparative Example 13. The resulting mixture further adjusted to pH 10-11 by addition of aqueous ammonia and then filtered through a ceramic-made precision filtration membrane with a pore size of 0.2 μm by causing the mixture to flow in parallel to the membrane face to give an emulsion with a fluoropolymer concentration of 63.1% by mass and a nonionic surfactant concentration of 4.4% by mass.

The fluorine-containing surfactant concentration in the emulsion obtained was determined according to the same procedure as in Experiment Example 1. The results are shown in Table 3.

TABLE 1

| | Fluoropolymer | Nonionic surfactant before purification (parts by mass per 100 parts by mass of fluoropolymer) | Purification method | Nonionic surfactant/ fluorine-containing surfactant | Fluoropolymer in purified emulsion (% by mass) | Nonionic surfactant in purified emulsion (% by mass) | Fluorine-containing surfactant in purified emulsion (ppm) | Aggregate or fibrous matter formation |
|---|---|---|---|---|---|---|---|---|
| Experiment Example 1 | TFE homopolymer | 12.2 | Phase separation once | 55.7 | 70.1 | 2.1 | 360 | None |
| Experiment Example 2 | TFE homopolymer | 12.2 | Phase separation twice | 238.0 | 66.1 | 1.9 | 110 | None |
| Experiment Example 3 | TFE homopolymer | 12.2 | Phase separation 3 times | 734.4 | 67.7 | 1.9 | 51 | None |
| Experiment Example 4 | TFE homopolymer | 12.2 | Phase separation 4 times | 1622.4 | 70.0 | 2.2 | 31 | None |
| Experiment Example 5 | TFE homopolymer | 12.2 | Phase separation/ electric | 237.6 | 68.7 | 2.3 | 230 | None |
| Experiment Example 6 | TFE homopolymer | 12.2 | Phase separation/ ion exchange | 237.6 | 68.4 | 1.7 | 210 | None |
| Experiment Example 7 | TFE homopolymer | 12.2 | Phase separation/ electric/ ion exchange | 237.6 | 66.8 | 1.9 | 130 | None |
| Experiment Example 8 | TFE homopolymer | 12.2 | electric 3 times | 55.7 | 64.3 | 2.1 | 300 | None |
| Experiment Example 9 | TFE homopolymer | 12.2 | ion exchange 3 times | 55.7 | 62.9 | 1.8 | 260 | None |
| Comparative Example 1 | TFE homopolymer | 7.2 | Membrane separation once | 32.9 | 61.8 | 4.2 | 620 | None |
| Comparative Example 2 | TFE homopolymer | 7.2 | Membrane separation twice | 72.0 | 60.1 | 4.7 | 370 | None |
| Comparative Example 3 | TFE homopolymer | 7.2 | Membrane separation 3 times | 117.3 | 60.8 | 4.4 | 180 | None |
| Comparative Example 4 | TFE homopolymer | 7.2 | Membrane separation 4 times | 244.0 | 61.2 | 4.3 | 100 | None |
| Comparative Example 5 | TFE homopolymer | 6.1 | Evaporation | 27.9 | 61.5 | 4.3 | 1200 | Observed |
| Comparative Example 6 | TFE homopolymer | 6.1 | Evaporation | 27.9 | 48.2 | 3.1 | 700 | None |

TABLE 2

| | Fluoropolymer | Nonionic surfactant before purification (parts by mass per 100 parts by mass of fluoropolymer) | Purification method | Nonionic surfactant/ fluorine-containing surfactant | Fluoropolymer in purified emulsion (% by mass) | Nonionic surfactant in purified emulsion (% by mass) | Fluorine-containing surfactant in purified emulsion (ppm) | Aggregate or fibrous matter formation |
|---|---|---|---|---|---|---|---|---|
| Experiment Example 10 | PFA | 14.7 | Phase separation once | 8.2 | 53.8 | 2.7 | 2800 | None |
| Experiment Example 11 | PFA | 14.7 | Phase separation twice | 28.2 | 52.6 | 2.8 | 850 | None |
| Experiment Example 12 | PFA | 14.7 | Phase separation/ electric | 28.2 | 50.4 | 2.9 | 1600 | None |
| Experiment Example 13 | PFA | 14.7 | Phase separation/ ion exchange | 28.2 | 48.9 | 2.3 | 1300 | None |
| Experiment Example 14 | PFA | 14.7 | Phase separation/ electric/ ion exchange | 46.3 | 51.1 | 2.8 | 930 | None |
| Comparative Example 7 | PFA | 8.7 | Membrane separation once | 4.9 | 48.4 | 6.5 | 4300 | None |
| Comparative Example 8 | PFA | 8.7 | Membrane separation twice | 9.8 | 49.0 | 5.1 | 2100 | None |

TABLE 2-continued

| | Fluoropolymer | Nonionic surfactant before purification (parts by mass per 100 parts by mass of fluoropolymer) | Purification method | Nonionic surfactant/ fluorine-containing surfactant | Fluoropolymer in purified emulsion (% by mass) | Nonionic surfactant in purified emulsion (% by mass) | Fluorine-containing surfactant in purified emulsion (ppm) | Aggregate or fibrous matter formation |
|---|---|---|---|---|---|---|---|---|
| Experiment Example 15 | FEP | 12.2 | Phase separation once | 7.3 | 65.2 | 2.5 | 2900 | None |
| Experiment Example 16 | FEP | 12.2 | Phase separation twice | 27.5 | 65.6 | 2.6 | 940 | None |
| Experiment Example 17 | FEP | 12.2 | Phase separation/ electric | 27.4 | 61.4 | 2.8 | 1700 | None |
| Experiment Example 18 | FEP | 12.2 | Phase separation/ ion exchange | 27.4 | 60.3 | 2.1 | 1700 | None |
| Experiment Example 19 | FEP | 12.2 | Phase separation/ electric/ ion exchange | 44.1 | 61.5 | 3.0 | 910 | None |
| Comparative Example 9 | FEP | 7.2 | Membrane separation once | 4.3 | 61.2 | 4.0 | 4500 | None |
| Comparative Example 10 | FEP | 7.2 | Membrane separation twice | 9.8 | 60.3 | 4.3 | 2200 | None |

TABLE 3

| | Fluoropolymer | Nonionic surfactant before purification (parts by mass per 100 parts by mass of fluoropolymer) | Purification method | Nonionic surfactant/ fluorine-containing surfactant | Fluoropolymer in purified emulsion (% by mass) | Nonionic surfactant in purified emulsion (% by mass) | Fluorine-containing surfactant in purified emulsion (ppm) | Aggregate or fibrous matter formation |
|---|---|---|---|---|---|---|---|---|
| Experiment Example 20 | PVdF | 11.8 | Phase separation once | 8.1 | 59.0 | 5.0 | 2100 | None |
| Experiment Example 21 | PVdF | 11.8 | Phase separation twice | 33.1 | 59.1 | 5.1 | 315 | None |
| Experiment Example 22 | PVdF | 11.8 | Phase separation/ electric | 33.2 | 55.1 | 5.0 | 630 | None |
| Experiment Example 23 | PVdF | 11.8 | Phase separation/ ion exchange | 33.2 | 55.0 | 4.9 | 520 | None |
| Experiment Example 24 | PVdF | 11.8 | Phase separation/ electric/ ion exchange | 103.2 | 56.1 | 4.9 | 150 | None |
| Comparative Example 11 | PVdF | 6.9 | Membrane separation once | 4.7 | 51.0 | 5.2 | 3050 | None |
| Comparative Example 12 | PVdF | 6.9 | Membrane separation twice | 11.5 | 51.1 | 5.1 | 640 | None |
| Experiment Example 25 | TFE/VdF/HFP copolymer | 12.2 | Phase separation once | 48.9 | 66.6 | 2.2 | 380 | None |
| Experiment Example 26 | TFE/VdF/HFP copolymer | 12.2 | Phase separation twice | 214.2 | 65.9 | 2.2 | 130 | None |
| Experiment Example 27 | TFE/VdF/HFP copolymer | 12.2 | Phase separation/ electric | 213.8 | 63.4 | 2.6 | 270 | None |
| Experiment Example 28 | TFE/VdF/HFP copolymer | 12.2 | Phase separation/ ion exchange | 213.8 | 63.2 | 2.9 | 220 | None |
| Experiment Example 29 | TFE/VdF/HFP copolymer | 12.2 | Phase separation/ electric/ ion exchange | 286.5 | 61.9 | 2.3 | 120 | None |
| Comparative Example 13 | TFE/VdF/HFP copolymer | 7.2 | Membrane separation once | 28.9 | 62.8 | 4.7 | 610 | None |
| Comparative Example 14 | TFE/VdF/HFP copolymer | 7.2 | Membrane separation twice | 74.4 | 63.1 | 4.4 | 350 | None |

In the above tables, the expression "nonionic surfactant/ fluorine-containing surfactant" indicates the content ratio between the nonionic surfactant and fluorine-containing surfactant in the diluted emulsion just prior to carrying out the final separation/concentration step.

As is evident from Tables 1-3, the purified emulsions obtained two or more repetitions of the procedure for concentration by phase separation were lower in residual fluorine-containing surfactant content as compared with the purified fluoropolymer emulsions obtained by carrying out the procedure for concentration by phase separation only once.

The purified emulsions obtained by carrying out the procedures for concentration by phase separation and electric concentration and/or ion exchange concentration were still lower in residual fluorine-containing surfactant content as compared with the fluoropolymer emulsions obtained by membrane separation/concentration.

The fluoropolymer emulsions obtained by membrane separation/concentration were higher in residual fluorine-containing surfactant content as compared with the purified emulsions obtained by concentration by phase separation, and some of them were low in fluoropolymer concentration.

In those Experiment Examples in which the "nonionic surfactant/fluorine-containing surfactant" was not lower than 60, the fluorine-containing surfactant concentrations in the purified emulsions obtained were not higher than 300 ppm.

EXPERIMENT EXAMPLE 30

The nonionic surfactant (44 g) was added to 600 g of the aqueous fluoropolymer emulsion obtained in Production Example 1, and the mixture was further adjusted to pH 10-11 by addition of aqueous ammonia and then allowed to stand at 70° C. and concentrated by phase separation to give a purified emulsion with a fluoropolymer concentration of 66.6% by mass and a nonionic surfactant concentration of 2.6% by mass.

The fluorine-containing surfactant concentration in the purified emulsion obtained was determined according to the same procedure as in Experiment Example 1. The results are shown in Table 4.

EXPERIMENT EXAMPLE 31

The nonionic surfactant (66 g) was added to 600 g of the aqueous fluoropolymer emulsion obtained in Production Example 1, and the mixture was further adjusted to pH 10-11 by addition of aqueous ammonia and then allowed to stand at 70° C. and concentrated by phase separation to give a purified emulsion with a fluoropolymer concentration of 71.4% by mass and a nonionic surfactant concentration of 2.4% by mass.

The fluorine-containing surfactant concentration in the purified emulsion obtained was determined according to the same procedure as in Experiment Example 1. The results are shown in Table 4.

EXPERIMENT EXAMPLE 32

Pure water (250 g) and 22 g of the nonionic surfactant were added to 300 g of the aqueous fluoropolymer emulsion obtained in Production Example 1, and the mixture was further adjusted to pH 10-11 by addition of aqueous ammonia and then allowed to stand at 70° C. and concentrated by phase separation to give a purified emulsion with a fluoropolymer concentration of 68.3% by mass and a nonionic surfactant concentration of 2.0% by mass.

The fluorine-containing surfactant concentration in the purified emulsion obtained was determined according to the same procedure as in Experiment Example 1. The results are shown in Table 4.

EXPERIMENT EXAMPLE 33

The nonionic surfactant (5 g) was added to 600 g of the aqueous fluoropolymer emulsion obtained in Production Example 1, and the mixture was further adjusted to pH 10-11 by addition of aqueous ammonia and then allowed to stand at 70° C., followed by trying to realize concentration by phase separation. However, the concentration by phase separation failed.

EXPERIMENT EXAMPLE 34

The nonionic surfactant (75 g) was added to 600 g of the aqueous fluoropolymer emulsion obtained in Production Example 1, and the mixture was further adjusted to pH 10-11 by addition of aqueous ammonia and then allowed to stand at 70° C. and concentrated by phase separation to give a purified emulsion with a fluoropolymer concentration of 67.8% by mass and a nonionic surfactant concentration of 3.0% by mass.

The fluorine-containing surfactant concentration in the purified emulsion obtained was determined according to the same procedure as in Experiment Example 1. The results are shown in Table 4.

EXPERIMENT EXAMPLE 35

The nonionic surfactant (85 g) was added to 600 g of the aqueous fluoropolymer emulsion obtained in Production Example 1, and the mixture was further adjusted to pH 10-11 by addition of aqueous ammonia and then allowed to stand at 70° C. and concentrated by phase separation to give a purified emulsion with a fluoropolymer concentration of 67.2% by mass and a nonionic surfactant concentration of 3.5% by mass.

The fluorine-containing surfactant concentration in the purified emulsion obtained was determined according to the same procedure as in Experiment Example 1. The results are shown in Table 4.

EXPERIMENT EXAMPLE 36

The nonionic surfactant (55 g) was added to 600 g of the aqueous fluoropolymer emulsion obtained in Production Example 2, and the mixture was further adjusted to pH 10-11 by addition of aqueous ammonia and then allowed to stand at 70° C. and concentrated by phase separation to give a purified emulsion with a fluoropolymer concentration of 55.8% by mass and a nonionic surfactant concentration of 3.2% by mass.

The fluorine-containing surfactant concentration in the purified emulsion obtained was determined according to the same procedure as in Experiment Example 1. The results are shown in Table 4.

EXPERIMENT EXAMPLE 37

The nonionic surfactant (5 g) was added to 600 g of the aqueous fluoropolymer emulsion obtained in Production Example 2, and the mixture was further adjusted to pH 10-11 by addition of aqueous ammonia and then allowed to stand at 70° C., followed by trying to realize concentration by phase separation. However, the concentration by phase separation failed.

EXPERIMENT EXAMPLE 38

The nonionic surfactant (66 g) was added to 600 g of the aqueous fluoropolymer emulsion obtained in Production Example 2, and the mixture was further adjusted to pH 10-11 by addition of aqueous ammonia and then allowed to stand at 70° C. and concentrated by phase separation to give a purified emulsion with a fluoropolymer concentration of 55.2% by mass and a nonionic surfactant concentration of 3.7% by mass.

The fluorine-containing surfactant concentration in the purified emulsion obtained was determined according to the same procedure as in Experiment Example 1. The results are shown in Table 4.

EXPERIMENT EXAMPLE 39

The nonionic surfactant (70 g) was added to 600 g of the aqueous fluoropolymer emulsion obtained in Production Example 2, and the mixture was further adjusted to pH 10-11 by addition of aqueous ammonia and then allowed to stand at 70° C. and concentrated by phase separation to give a purified emulsion with a fluoropolymer concentration of 54.9% by mass and a nonionic surfactant concentration of 4.0% by mass.

The fluorine-containing surfactant concentration in the purified emulsion obtained was determined according to the same procedure as in Experiment Example 1. The results are shown in Table 4.

EXPERIMENT EXAMPLE 40

The nonionic surfactant (66 g) was added to 600 g of the aqueous fluoropolymer emulsion obtained in Production Example 3, and the mixture was further adjusted to pH 10-11 by addition of aqueous ammonia and then allowed to stand at 70° C. and concentrated by phase separation to give a purified emulsion with a fluoropolymer concentration of 65.4% by mass and a nonionic surfactant concentration of 2.9% by mass.

The fluorine-containing surfactant concentration in the purified emulsion obtained was determined according to the same procedure as in Experiment Example 1. The results are shown in Table 4.

EXPERIMENT EXAMPLE 41

The nonionic surfactant (5 g) was added to 600 g of the aqueous fluoropolymer emulsion obtained in Production Example 3, and the mixture was further adjusted to pH 10-11 by addition of aqueous ammonia and then allowed to stand at 70° C., followed by trying to realize concentration by phase separation. However, the concentration by phase separation failed.

EXPERIMENT EXAMPLE 42

The nonionic surfactant (75 g) was added to 600 g of the aqueous fluoropolymer emulsion obtained in Production Example 3, and the mixture was further adjusted to pH 10-11 by addition of aqueous ammonia and then allowed to stand at 70° C. and concentrated by phase separation to give a purified emulsion with a fluoropolymer concentration of 65.7% by mass and a nonionic surfactant concentration of 3.3% by mass.

The fluorine-containing surfactant concentration in the purified emulsion obtained was determined according to the same procedure as in Experiment Example 1. The results are shown in Table 4.

EXPERIMENT EXAMPLE 43

The nonionic surfactant (85 g) was added to 600 g of the aqueous fluoropolymer emulsion obtained in Production Example 3, and the mixture was further adjusted to pH 10-11 by addition of aqueous ammonia and then allowed to stand at 70° C. and concentrated by phase separation to give a purified emulsion with a fluoropolymer concentration of 64.5% by mass and a nonionic surfactant concentration of 3.7% by mass.

The fluorine-containing surfactant concentration in the purified emulsion obtained was determined according to the same procedure as in Experiment Example 1. The results are shown in Table 4.

EXPERIMENT EXAMPLE 44

The nonionic surfactant (40 g) was added to 600 g of the aqueous fluoropolymer emulsion obtained in Production Example 4, and the mixture was further adjusted to pH 10-11 by addition of aqueous ammonia and then allowed to stand at 70° C. and concentrated by phase separation to give a purified emulsion with a fluoropolymer concentration of 59.0% by mass and a nonionic surfactant concentration of 5.1% by mass.

The fluorine-containing surfactant concentration in the purified emulsion obtained was determined according to the same procedure as in Experiment Example 1. The results are shown in Table 4.

EXPERIMENT EXAMPLE 45

The nonionic surfactant (2.9 g) was added to 600 g of the aqueous fluoropolymer emulsion obtained in Production Example 4, and the mixture was further adjusted to pH 10-11 by addition of aqueous ammonia and then allowed to stand at 70° C. in an attempt to realize concentration by phase separation. However, the attempt at phase separation failed.

EXPERIMENT EXAMPLE 46

The nonionic surfactant (66 g) was added to 600 g of the aqueous fluoropolymer emulsion obtained in Production Example 5, and the mixture was further adjusted to pH 10-11 by addition of aqueous ammonia and then allowed to stand at 70° C. and concentrated by phase separation to give a purified emulsion with a fluoropolymer concentration of 68.1% by mass and a nonionic surfactant concentration of 2.5% by mass.

The fluorine-containing surfactant concentration in the purified emulsion obtained was determined according to the same procedure as in Experiment Example 1. The results are shown in Table 4.

EXPERIMENT EXAMPLE 47

The nonionic surfactant (5 g) was added to 600 g of the aqueous fluoropolymer emulsion obtained in Production Example 5, and the mixture was further adjusted to pH 10-11 by addition of aqueous ammonia and then allowed to stand at 70° C., followed by trying to realize concentration by phase separation. However, the concentration by phase separation failed.

EXPERIMENT EXAMPLE 48

The nonionic surfactant (75 g) was added to 600 g of the aqueous fluoropolymer emulsion obtained in Production Example 5, and the mixture was further adjusted to pH 10-11 by addition of aqueous ammonia and then allowed to stand at 70° C. and concentrated by phase separation to give a purified emulsion with a fluoropolymer concentration of 67.3% by mass and a nonionic surfactant concentration of 3.4% by mass.

The fluorine-containing surfactant concentration in the purified emulsion obtained was determined according to the same procedure as in Experiment Example 1. The results are shown in Table 4.

EXPERIMENT EXAMPLE 49

The nonionic surfactant (85 g) was added to 600 g of the aqueous fluoropolymer emulsion obtained in Production Example 5, and the mixture was further adjusted to pH 10-11 by addition of aqueous ammonia and then allowed to stand at 70° C. and concentrated by phase separation to give a purified emulsion with a fluoropolymer concentration of 66.8% by mass and a nonionic surfactant concentration of 3.9% by mass.

The fluorine-containing surfactant concentration in the purified emulsion obtained was determined according to the same procedure as in Experiment Example 1. The results are shown in Table 4.

EXPERIMENT EXAMPLE 50

The nonionic surfactant (22 g) was added to 600 g of the aqueous fluoropolymer emulsion obtained in Production Example 6, and the mixture was further adjusted to pH 10-11 by addition of aqueous ammonia and then allowed to stand at 70° C. and concentrated by phase separation to give a purified emulsion with a fluoropolymer concentration of 69.7% by mass and a nonionic surfactant concentration of 2.0% by mass.

The fluorine-containing surfactant concentration in the purified emulsion obtained was determined according to the same procedure as in Experiment Example 1. The results are shown in Table 4.

In Table 4, the expression "TFE homopolymer polymerized under high pressure" indicates the TFE homopolymer obtained by the polymerization in Production Example 6.

TABLE 4

| | Fluoropolymer | Nonionic surfactant before purification (parts by mass per 100 parts by mass of fluoropolymer) | Purification method | Nonionic surfactant/ fluorine-containing surfactant | Fluoropolymer in purified emulsion (% by mass) | Nonionic surfactant in purified emulsion (% by mass) | Fluorine-containing surfactant in purified emulsion (ppm) | Aggregate or fibrous matter formation |
|---|---|---|---|---|---|---|---|---|
| Experiment Example 30 | TFE homopolymer | 24.4 | Phase separation | 111.5 | 66.6 | 2.6 | 270 | None |
| Experiment Example 31 | TFE homopolymer | 36.7 | Phase separation | 167.2 | 71.4 | 2.4 | 180 | None |
| Experiment Example 32 | TFE homopolymer | 24.4 | Phase separation | 111.5 | 68.3 | 2.0 | 180 | None |
| Experiment Example 33 | TFE homopolymer | 2.8 | Phase separation | 12.7 | No concentration | No concentration | No concentration | None |
| Experiment Example 34 | TFE homopolymer | 41.7 | Phase separation | 190.0 | 67.8 | 3.0 | 170 | None |
| Experiment Example 35 | TFE homopolymer | 47.2 | Phase separation | 215.3 | 67.2 | 3.5 | 170 | None |
| Experiment Example 36 | PFA | 36.7 | Phase separation | 20.6 | 55.8 | 3.2 | 1100 | None |
| Experiment Example 37 | PFA | 3.3 | Phase separation | 1.9 | No concentration | No concentration | No concentration | None |
| Experiment Example 38 | PFA | 44.0 | Phase separation | 24.7 | 55.2 | 3.7 | 990 | None |
| Experiment Example 39 | PFA | 46.7 | Phase separation | 26.2 | 54.9 | 4.0 | 980 | None |
| Experiment Example 40 | FEP | 36.7 | Phase separation | 22.0 | 65.4 | 2.9 | 1600 | None |
| Experiment Example 41 | FEP | 2.8 | Phase separation | 1.7 | No concentration | No concentration | No concentration | None |
| Experiment Example 42 | FEP | 41.7 | Phase separation | 25.0 | 65.7 | 3.3 | 1600 | None |
| Experiment Example 43 | FEP | 47.2 | Phase separation | 28.3 | 64.5 | 3.7 | 1600 | None |
| Experiment Example 44 | PVdF | 39.2 | Phase separation | 26.9 | 59.0 | 5.1 | 1450 | None |
| Experiment Example 45 | PVdF | 2.8 | Phase separation | 1.9 | No concentration | No concentration | No concentration | None |
| Experiment Example 46 | TFE/VdF/HFP copolymer | 36.7 | Phase separation | 146.7 | 68.1 | 2.5 | 140 | None |
| Experiment Example 47 | TFE/VdF/HFP copolymer | 2.8 | Phase separation | 11.1 | No concentration | No concentration | No concentration | None |
| Experiment Example 48 | TFE/VdF/HFP copolymer | 41.7 | Phase separation | 166.7 | 67.3 | 3.4 | 120 | None |
| Experiment Example 49 | TFE/VdF/HFP copolymer | 47.2 | Phase separation | 188.9 | 66.8 | 3.9 | 120 | None |
| Experiment Example 50 | TFE homopolymer polymerized under high pressure | 12.2 | Phase separation | 95.3 | 69.7 | 2.0 | 190 | None |

As is evident from the results shown in Table 4, the purified emulsions obtained by carrying out the procedure for concentration by phase separation in the presence of 20-40 parts by mass, per 100 parts by mass of the fluoropolymer, of the nonionic surfactant could be reduced in fluorine-containing surfactant level to a satisfactory extent even when the procedure for concentration by phase separation was carried out only once. On the contrary, when the procedure for concentration by phase separation was carried out in the presence of less than 20 parts by mass, per 100 parts by mass of the fluoropolymer, of the nonionic surfactant, no purified emulsions could be obtained.

The purified emulsion obtained by concentration by phase separation of the aqueous fluoropolymer emulsion obtained by the method of polymerization under increased polymerization pressure, in which the addition amount of the fluorine-containing surfactant in the step of polymerization is small, could be reduced in fluorine-containing surfactant level by carrying out the concentration by phase separation only once.

Comparison was made between Experiment Example 34 and Experiment Example 35, between Experiment Example 38 and Experiment Example 39, between Experiment Example 42 and Experiment Example 43, or between Experiment Example 48 and Experiment Example 49 revealed that even when the nonionic surfactant addition level was not higher than 45 parts by mass per 100 parts by mass of the fluoropolymer, the fluorine-containing surfactant could be effectively removed, like in the cases where the nonionic surfactant was added in an amount exceeding 45 parts by mass.

INDUSTRIAL APPLICABILITY

The method of purifying an aqueous fluoropolymer emulsion according to the present invention, which has the constitution described hereinabove, can remove the fluorine-containing surfactant, without reducing the dispersibility of the purified emulsions obtained by the method of purification.

The invention claimed is:

1. A method of purifying an aqueous fluoropolymer emulsion comprising; purifying an aqueous fluoropolymer emulsion by a specific technique of concentration
wherein the aqueous fluoropolymer emulsion comprises a fluoropolymer and a fluorine-containing surfactant,
said specific technique of concentration is the concentration by phase separation,
said concentration by phase separation is carried out for removing said fluorine-containing surfactant, and
wherein said concentration by phase separation has a separation/removal step comprising; heating said emulsion in the presence of 15 to 40 parts by mass of the nonionic surfactant per 100 parts by mass of the fluoropolymer to thereby cause separation into an aqueous phase and a concentrated phase, followed by removing said aqueous phase to obtain said concentrated phase,
said concentration by phase separation is carried out twice or more times, and
said concentration by phase separation in the N-th time run (N being an integer of 2 or more) further has, prior to the separation/removal step, a water addition step comprising; adding water to the concentrated phase obtained by the separation/removal step in the concentration by phase separation in the (N−1)th time run (N being the same as above) to thereby obtain a diluted emulsion.

2. The method of purifying an aqueous fluoropolymer emulsion according to claim 1,
wherein the fluoropolymer is a tetrafluoroethylene homopolymer and/or a modified polytetrafluoroethylene.

3. The method of purifying an aqueous fluoropolymer emulsion according to claim 1,
wherein the concentration by phase separation is carried out in the presence of not less than 8,000 parts by mass of the nonionic surfactant per 100 parts by mass of the fluorine-containing surfactant.

4. The method of purifying an aqueous fluoropolymer emulsion according to claim 2,
wherein a purified emulsion obtained by purification contains not more than 300 ppm of the fluorine-containing surfactant.

5. The method of purifying an aqueous fluoropolymer emulsion according to claim 1,
wherein the fluorine-containing surfactant is an anionic surfactant.

6. The method of purifying an aqueous fluoropolymer emulsion according to claim 5,
wherein the anionic surfactant is a perfluorocarboxylic acid salt or an ω-H type fluorocarboxylic acid salt.

7. A purified emulsion
which is obtainable by the method of purifying an aqueous fluoropolymer emulsion according to claim 1.

8. A fluorine-containing processed product
which is obtainable by processing using the purified emulsion according to claim 7.

9. A method of purifying an aqueous fluoropolymer emulsion comprising; purifying an aqueous fluoropolymer emulsion by a specific technique of concentration
wherein the aqueous fluoropolymer emulsion comprises a fluoropolymer and a fluorine-containing surfactant,
said specific technique of concentration is the concentration by phase separation,
said concentration by phase separation is carried out for removing said fluorine-containing surfactant,
said concentration by phase separation is carried out twice or more times, and
wherein said concentration by phase separation has a separation/removal step comprising; heating said emulsion in the presence of the nonionic surfactant to thereby cause separation into an aqueous phase and a concentrated phase, followed by removing said aqueous phase to obtain said concentrated phase,
in the first time run, said concentration by phase separation is carried out in the presence of 20 to 45 parts by mass of the nonionic surfactant per 100 parts by mass of the fluoropolymer, and in the second or more times run, in the presence of 3 to 45 parts by mass of the nonionic surfactant per 100 parts by mass of the fluoropolymer, and
said concentration by phase separation in the N-th time run (N being an integer of 2 or more) further has, prior to the separation/removal step, a water addition step comprising; adding water to the concentrated phase obtained by the separation/removal step in the concentration by phase separation in the (N−1)th time run (N being the same as above) to thereby obtain a diluted emulsion.

* * * * *